(12) United States Patent
Haneda et al.

(10) Patent No.: US 6,819,449 B2
(45) Date of Patent: Nov. 16, 2004

(54) IMAGE PRINTING AND FILING SYSTEM

(75) Inventors: Norihisa Haneda, Asaka (JP); Atsushi Ito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 572 days.

(21) Appl. No.: 08/839,361

(22) Filed: Apr. 18, 1997

(65) Prior Publication Data

US 2002/0015161 A1 Feb. 7, 2002

(30) Foreign Application Priority Data

Apr. 19, 1996 (JP) .............................. 8-120778

(51) Int. Cl.⁷ .......................... G06F 15/00; G06K 1/00; G06K 9/00
(52) U.S. Cl. ...................... 358/1.6; 358/1.18; 382/319
(58) Field of Search ................................ 395/101, 102, 395/106, 117; 358/1.1, 1.2, 1.6, 1.18; 382/318, 319

(56) References Cited

U.S. PATENT DOCUMENTS

| | | | | |
|---|---|---|---|---|
| 4,567,359 A | * | 1/1986 | Lockwood | 235/381 |
| 5,119,126 A | * | 6/1992 | Tokuda | 355/41 |
| 5,132,915 A | * | 7/1992 | Goodman | 364/479.03 |
| 5,218,455 A | * | 6/1993 | Kristy | 358/403 |
| 5,237,157 A | * | 8/1993 | Kaplan | 235/375 |
| 5,270,839 A | * | 12/1993 | Parulski et al. | 358/474 |
| 5,420,699 A | * | 5/1995 | Yamanouchi et al. | 358/487 |
| 5,477,353 A | * | 12/1995 | Yamasaki | 358/487 |
| 5,615,391 A | * | 3/1997 | Klees | 395/839 |
| 5,649,260 A | * | 7/1997 | Wheeler et al. | 396/569 |
| 5,666,215 A | * | 9/1997 | Fredlund et al. | 358/487 |
| 5,715,034 A | * | 2/1998 | Yamamoto | 355/40 |
| 5,872,591 A | * | 2/1999 | Truc et al. | 348/96 |

* cited by examiner

Primary Examiner—Mehrdad Dastouri
(74) Attorney, Agent, or Firm—Birch, Stewart, Kolasch, & Birch, LLP

(57) ABSTRACT

An image printing apparatus comprises a digital medium reading device reading digital image data recorded on a digital medium, an image printer printing an image represented by the digital image data read by the digital medium reading device, and a charging information printer printing charging information necessary for print service charge, said charging information relating to image print processing executed in the image printer. The charging information printer issues an slip carrying thereon the charging information. The customer is correctly charged for the service performed by the image printing apparatus on the basis of the charging information appearing on the slip.

15 Claims, 39 Drawing Sheets

*Fig. 9a*

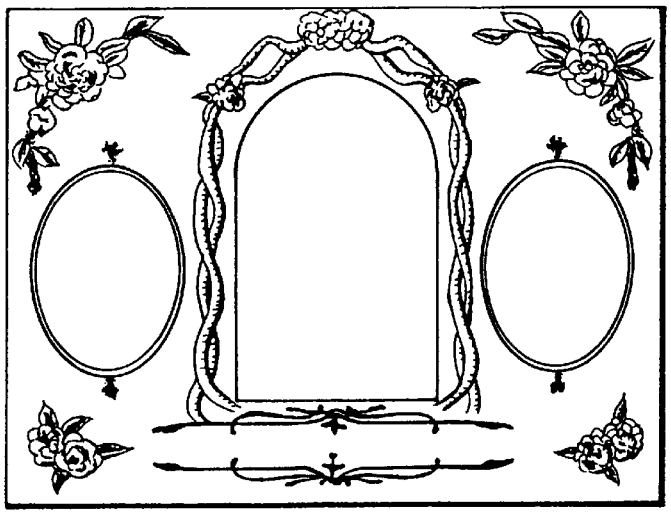

*Fig. 9b*

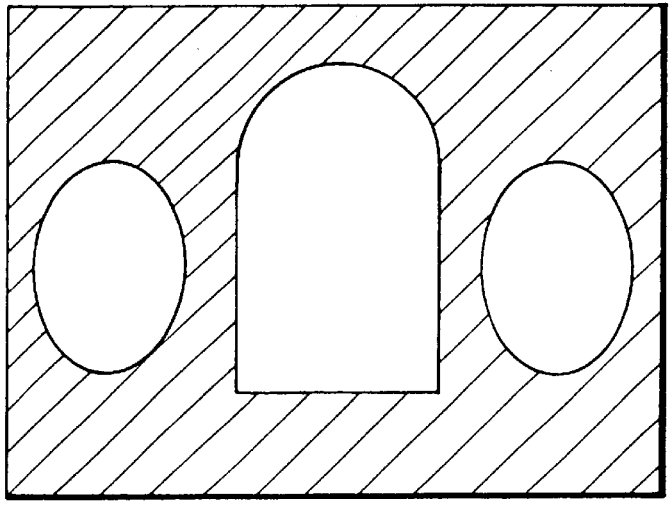

*Fig. 9c*

| | |
|---|---|
| PICTURE NUMBER = 3; | NUMBER OF SYNTHESIZED IMAGES |
| PICTURE1 ADDRESS = 105.857.703.934; | POSITIONAL INFORMATION OF SYNTHESIZED IMAGE AREA |
| PICTURE2 ADDRESS = 979.261.1035.1694; | |
| PICTURE3 ADDRESS = 2187.857.703.934; | |
| TITLE NUMBER = 1; | NUMBER OF TITLES |
| TITLE1 ADDRESS = 828.2155.1344.84; | TITLE SYNTHESIS POSITION |
| TITLE1 FONT TYPE = "MS GOTHIC"; | TYPEFACE NAME OF TITLE FONT |
| TITLE1 FONT SIZE = 84; | TITLE FONT SIZE |
| TITLE1 FONT COLOR = 0.0.0; | TITLE FONT COLOR |
| TITLE1 FONT FORMAT = 1; | TITLE LAYOUT |

Fig.34a

```
12:30, APRIL 1, 1996
SERVICE NAME :  P : DECORATION
INPUT MEDIUM : APS FILM
TYPE :            WEDDING CEREMONY
NUMBER OF SERVICES :    1
SERVICE NO. :    1-0
          THANK YOU!!
```

Fig.34b

```
13:00, APRIL 1, 1996
SERVICE NAME :  P: ENLARGEMENT
INPUT MEDIUM : OPTICAL DISK
TYPE :            VERTICAL
NUMBER OF SERVICES :  1
SERVICE NO. :    2-0
          THANK YOU!!.
```

Fig.34c

```
13:30, APRIL 1, 1996
SERVICE NAME :  D : OPTICAL DISK
                      /NORMAL
INPUT MEDIUM : APS FILM
NUMBER OF SERVICES :  15
SERVICE NO. :    3-0
          THANK YOU!!
```

Fig.34d

```
14:00, APRIL 1, 1996
SERVICE NAME :  D : FD/ECONOMY
INPUT MEDIUM : APS FILM
NUMBER OF SERVICES :  25
SERVICE NO. :    4-0
          THANK YOU!!
```

Fig.34e

```
14:30, APRIL 1, 1996
SERVICE NO. :    5-0
SERVICE HAS BEEN CANCELLED.
```

Fig. 39a

SERVICE CONTENTS HAVE BEEN TRANSFERRED ... .

SERVICE NAME :        P : ENLARGEMENT

INPUT MEDIUM :        OPTICAL DISK

TYPE :                VERTICAL

NUMBER OF SERVICES :  1

THANK YOU !!

IMAGE PRINTING AND FILING SYSTEM

BACKGROUND OF THE INVENTION

1. Field of the Invention

The present invention relates to an apparatus and a system for printing an image represented by digital image data recorded on a digital medium, an apparatus and a system for printing an image appearing on a visible image medium upon reading the image and executing image processing such as enlargement of the image, and an apparatus and a system for recording on a digital medium image data representing an image appearing on a visible image medium.

The digital medium means a medium on which digital image data representing an image is or can be recorded, for example, a magnetic disk, an optical disk, a magneto-optical disk or a memory card. The visible image medium means a medium on which an image capable of being seen by a human is displayed, for example, a picture, a film (including both a negative film and a positive film) or a poster.

2. Description of the Related Art

The digitization of a variety of information and the preservation of such information by recording it on various recording media have been realized by the popularization of computers and devices that utilize them. Image information is no exception. There is growing need for a system capable of reading, by way of a scanner, images that appear on visible image media such as photographic films, photographs, printed matters and the like, converting the read images to digital image data and recording these data on a digital medium such as a magnetic disk, a system capable of reading digital image data recorded on a digital medium and outputting images represented by the read digital image data as visible image media. Further it is desired to realize a system capable of reading images appearing on a visible image media, subjecting the read images to image treatment processing such as enlargement, reduction, rotation, inlaying to template images, color conversion and so on, and printing the processed images.

Such possible or expected systems would be or might be operated by an expert. On the other hand, however, it is also desirable that the users or customers themselves operate the system to create or modify images, print the images or record the image data on a digital medium. In order to realize such utilization of the systems, the above systems would be placed in various places such as a convenience store, a photography shop, etc., to allow the users or customers to operate the system.

A problem would arise how the users or customers are charged for the services offered to them in utilizing the above system and how the service charges (fees) are collected in a case where the users or customers themselves operate the system. Since the unit charge for use of the system would be relatively high, an unmanned fee collecting apparatus is not preferable to be set in view of security. It would be required to allow a clerk of a store to charge for the service offered by the system upon knowing how the system is utilized.

SUMMARY OF THE INVENTION

An object of the invention is to allow a clerk of a store to realize the state of customers' use of an image printing or filing apparatus or system and to charge correctly.

A first aspect of the present invention relates to an image printing apparatus or system in which digital image data recorded on a digital medium are read and an image represented by the digital image data is printed.

An image printing apparatus according to the first aspect of the present invention comprises a digital medium reading device reading digital image data recorded on a digital medium, an image printer printing an image represented by the digital image data read by the digital medium reading device, and a charging information printer printing charging information necessary for print service charge, the charging information relating to image print processing executed in the image printer.

The charging information includes such items as a date, a service name, a kind of the digital medium, a number of prints and a service number.

The charging information including information necessary for image print service charge is printed and a slip carrying the charging information thereon is issued. The customer utilizing the image printing apparatus receives or picks up the issued slip carrying the charging information thereon and shows it to or hands it over to the clerk of the store, who can understand the contents of the operations by the customer or the contents of services the customer is offered. Thus the clerk of the store can correctly charge the customer for the print image services that the image printing apparatus performs.

The charging information may further include information relating to cancellation of the image print processing by the image printer when the image print processing by the image printer is cancelled.

The clerk of the store can know the image print service has been cancelled and judge whether the customer should be charged or not.

An image printing system according to the first aspect of the present invention comprises the above mentioned image printing apparatus and a charging information confirming apparatus. The image printing apparatus and the charging information confirming apparatus are connected so as to communicate with each other.

The image printing apparatus further comprises a charging information transmitting device sending the charging information to the charging information confirming apparatus.

The charging information confirming apparatus comprises a charging information receiving device receiving the charging information sent from the charging information transmitting device, and a display device displaying the charging information received by the charging information receiving device.

The charging information confirming apparatus can be realized by an electronic cash register.

The charging information generated in the image printing apparatus is, on one hand, printed on a slip and, on the other hand, transmitted to the charging information confirming apparatus to be displayed on the display device, which, in general, is placed near the cashier. The clerk of the store (cashier) can realize the contents of the image print services and know the information necessary to charge for the image print services by merely seeing the display screen. Further the clerk can compare the charging information on the issued slip with the charging information displayed on the display device to confirm that the customer taking the slip is one who has to be charged.

Preferably, the image printing apparatus further comprises an image processor executing image treatment processing including at least one of enlarging, reducing, compressing, rotating, synthesizing to a template image and color conversion of the image represented by the digital image data read by the digital medium reading device. The image printer prints the image processed by the image processor. The image print service is enhanced by this image treatment processing.

The charging information may further include information concerning the contents of the image treatment processing or a form of print.

A second aspect of the present invention relates to an image printing apparatus or system in which a visible image appearing on a visible image medium is read and the read visible image is printed.

An image printing apparatus according to the second aspect of the present invention comprises a visible image medium reading device reading a visible image appearing on a visible image medium and outputting a signal representing the read visible image, an image printer printing an image represented by the signal outputted from the visible image medium reading device, and a charging information printer printing charging information necessary for print service charge, the charging information relating to image print processing executed in the image printer.

The clerk of the store can correctly charge the customer for the image print service based on the printed charging information.

The image printing apparatus may further comprises an image processor executing image treatment processing including at least one of enlarging, reducing, compressing, rotating, synthesizing to a template image and color conversion of the image represented by the signal outputted by the visible image medium reading device, wherein said image printer prints the image processed by said image processor. The print service is further enhanced.

The charging information includes a date, a service name, a kind of the visible image medium, a form of print, a number of prints and a service number, for example.

The charging information may further include information relating to cancellation of the image print processing by the image printer when the image print processing by the image printer is cancelled.

The clerk judges whether or not the customer cancelling the service should be charged or not.

An image printing system according to the second aspect of the present invention comprises the above image printing apparatus and a charging information confirming apparatus. The image printing apparatus and the charging information confirming apparatus are connected so as to communicate with each other.

The image printing apparatus further comprises a charging information transmitting device sending the charging information to said charging information confirming apparatus.

The charging information confirming apparatus comprises a charging information receiving device receiving the charging information sent from the charging information transmitting device, and a display device displaying the charging information received by the charging information receiving device. The charging information confirming apparatus may be an electronic cash register.

The charging information generated in the image printing apparatus is transmitted to the charging information confirming apparatus to be displayed on the display device. The clerk of the store can realize the contents of the image print services and know the information necessary to charge for the image print services by merely seeing the display screen.

A third aspect of the present invention relates to an image filing apparatus or system in which a visible image appearing on a visible image medium is read and digital image data representing the read visible image are produced to be recorded on a digital medium.

An image filing apparatus according to the third aspect of the present invention comprises a visible image medium reading device reading a visible image appearing on a visible image medium and outputting digital image data representing the read visible image, a digital medium recording device recording on a digital medium the digital image data representing the visible image and outputted from the visible image medium reading device, and a charging information printer printing charging information necessary for record service charge, the charging information relating to record processing executed in the digital medium recording device.

The charging information includes such items as a date, a service name, a kind of the visible image medium, a number of frames and a service number.

The charging information including information necessary for record service charge is printed and a slip carrying the charging information thereon is issued. The customer utilizing the image filing apparatus receives or takes up the issued slip carrying the charging information thereon and shows it to or hands it over to the clerk of the store, who can understand the contents of the operations by the customer or the contents of services the customer is offered. Thus, the clerk of the store can correctly charge the customer for the record services the image filing apparatus performs.

The charging information includes information relating to cancellation of the record processing by the digital medium recording device when the record processing by the digital medium recording device is cancelled.

The clerk of the store can know the record service has been cancelled and judge whether the customer should be charged.

An image filing system according to the third aspect of the present invention comprises the above image filing apparatus and a charging information confirming apparatus, the image filing apparatus and the charging information confirming apparatus being connected so as to communicate with each other.

The image filing apparatus further comprises a charging information transmitting device sending the charging information to the charging information confirming apparatus.

The charging information confirming apparatus comprises a charging information receiving device receiving the charging information sent from the charging information transmitting device, and a display device displaying the charging information received by the charging information receiving device.

The charging information confirming apparatus may be an electronic cash register.

The charging information generated in the image filing apparatus is, on one hand, printed on a slip and, on the other hand, transmitted to the charging information confirming apparatus to be displayed on the display device, which, in general, is placed near the cashier. The clerk of the store (cashier) can realize the contents of the digital image data record services and know the information necessary to charge for the record service by merely seeing the display screen. Further the clerk can compares the charging information on the issued slip with the charging information displayed on the display device to confirm that the customer taking the slip in one who has to be charged.

Preferably the image filing apparatus further comprises an image processor executing image treatment processing including at least one of enlarging, reducing, compressing, rotating, synthesizing to a template image and color conversion of the image represented by the digital image data outputted from the visible image medium reading device. The digital medium recording device records the digital image data representing the image processed by the image processor.

The digital image data record service is enhanced by this image treatment processing.

The charging information may further include information concerning the contents of the image treatment processing.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 9a illustrates an example of a template image,

FIG. 9b illustrates an example of a mask image, and FIG. 9c illustrates an example of synthesis information;

FIGS. 34a to 34e illustrate examples of printed slip;

FIGS. 39a and 39b illustrate examples of display screens appearing on the screen of a display device of the electronic cash register.

DETAILED DESCRIPTION OF THE PREFERRED EMBODIMENTS (1) Photographic Film with Information Recording Portion A photographic film of a conventional type (a so-called 35 mm film) is a 12-exposure, 24-exposure or 36-exposure roll of film. This photographic film is cut to a length for six frames after development, and is generally housed in a sheath to be stored. Merely an image of a photographed subject and its frame number are recorded on the photographic film of a conventional type. Information relating to the image of the subject (for example, information briefly expressing the image, date of photographing, and shutter speed) other than the frame number are not recorded. Therefore, the information relating to the subject image other than the frame number must be written into the sheath, or noted on another paper. A photographic film of a new type has been developed. Information relating to a subject image, for example, information briefly expressing the image, date of photographing and shutter speed which cannot be recorded on the conventional photographic film can be recorded on the new type (Advanced Photo System=APS) photographic film. In an image filing and printing apparatus according to the present embodiment, description is made of a case where the new type photographic film is used. It goes without saying that the photographic film of a conventional type, a picture and the like can be used in the image filing and printing apparatus.

Figure 1:
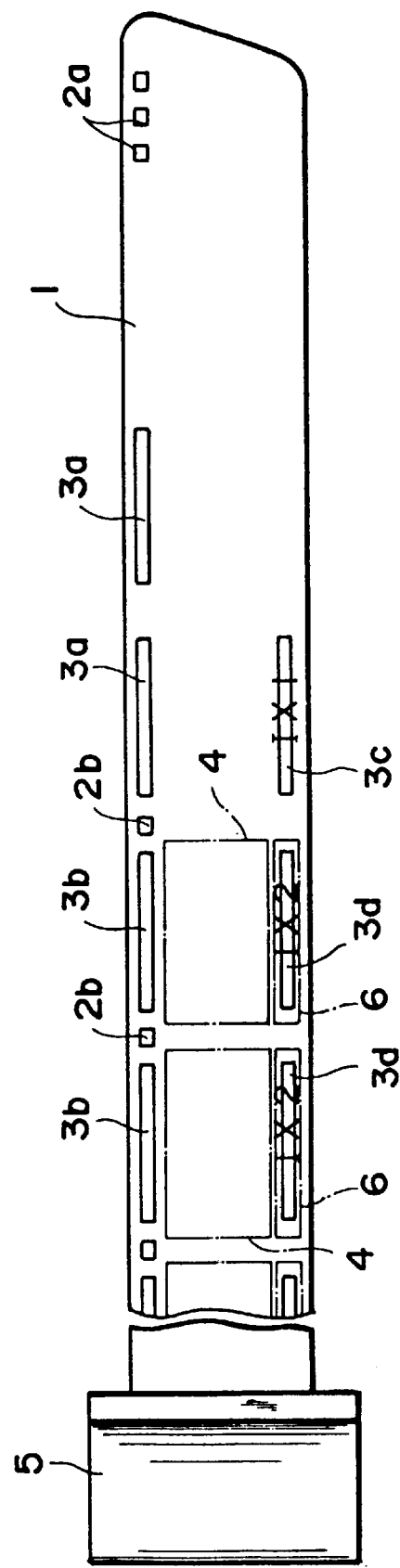
FIG. 1 illustrates a new (APS) photographic film having an information recording portion.

FIG. 1 illustrates a photographic film of a new type, that is, an APS film with an information recording portion.

A new photographic film 1 has its terminal fixed to a spool rotatably provided in a cartridge (Patrone) 5. FIG. 1 illustrates a state where the photographic film 1 is drawn out of the cartridge 5.

Some perforations 2a (or one or a plurality of notches) for engaging the photographic film 1 with a part of a photographic film winding shaft of a camera are formed in the distal end of the photographic film 1.

There are areas 4 on which an image is recorded on the whole of the photographic film 1 excluding the both end portions having a suitable length (this area is formed by photographing, which is indicated by a one-dot and dash line for convenience of illustration in FIG. 1). Further, an optical information recording area 6 in a long narrow strip shape is provided on one face of the film 1 below each of the image recording areas 4 (this area 6 is formed by exposure and development, which is also indicated by a one-dot and dash line for convenience of illustration in FIG. 1).

Magnetic information recording areas (portions) 3b and 3d in a long narrow strip shape are provided on the other face of the film 1 on both (upper and lower) sides of each of the image recording areas 4. The one magnetic information recording area 3d is overlapped with the optical information recording area 6 via a base of the film 1. One perforation (or two or more perforations) 2b is formed in correspondence to each of the image recording areas 4 between the other information recording areas 3b. The perforation 2b is used for mainly putting the image recording area 4 at an image formation position in the camera.

Magnetic information recording areas 3a and 3c are also provided on the other face of the film 1 in the end of the photographic film 1 on both sides thereof.

The magnetic information recording portions 3a, 3b, 3c and 3d are magnetic recording layers generally formed by applying a transparent magnetic material on a film. The magnetic information recording areas 3a and 3b provided on one side of the photographic film 1 are generally used in a laboratory. The magnetic information recording areas 3c and 3d provided on the other side of the photographic film 1 are generally used for recording information (data) in response to entry by a user or automatically by the camera. The optical information recording areas 6 are generally used in order for a manufacturer to record information.

The magnetic information recording areas (reader information recording areas) 3a and 3c in the distal end are used for recording information (film information) relating to one roll of film 1. The magnetic information recording areas (frame information recording areas) 3b and 3d provided in correspondence to each of the image recording areas 4 are used for recording information (frame information) relating to an image recorded on the area 4. The optical information recording areas 6 are for recording information such as a manufacturer code and a frame number.

As an example, comprehensive information relating to the whole of an image picked up using the photographic film is recorded on the reader information recording area 3c which is utilized by the user. This information is referred to as IX1.

Examples of the information recorded on the frame information recording area 3d which is utilized by the user include title information entered into the camera by the user (a title is one for briefly expressing an image, for example, "picture of flower", "picture of animal", "picture of children, or "travel"), and information automatically recorded by the camera (for example, shutter speed used when an image for its frame is picked up). The information are referred to as information IX2. Only the information entered by the user may be taken as IX2.

Figure 2:
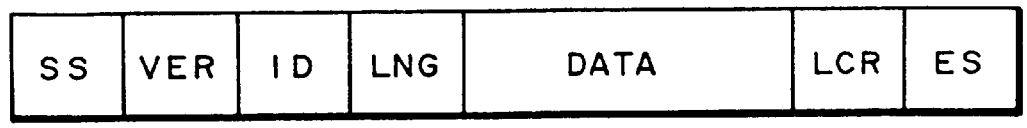
FIG. 2 illustrates the format of data recorded on an information recording portion.

FIG. 2 illustrates a data arrangement (a data format) in the magnetic information recording areas 3a, 3b, 3c and 3d of the photographic film. The data format is applied to both the information IX1 and IX2, and includes SS, VER, ID, LNG, DATA, LCR and ES.

SS is an abbreviation for "Start Sentinal", and is a code representing the start of a data string. VER represents the version of a recording format (a standard). ID represents the type of information to be recorded (IX1, IX2, etc.). LNG represents the length of succeeding data (DATA). DATA is data representing information which desires to be recorded or should be recorded. LCR is a CRC check code. ES is an abbreviation for "End Sentinal", and is a code representing the end of the data string.

One or a plurality of data strings of such a format are provided in each of the magnetic information recording areas 3a, 3b, 3c and 3d. For example, a data string representing data entered by the user and a data string representing data written by the camera are recorded on the frame information recording area 3d. A plurality of identical data strings are recorded in parallel on the magnetic information recording area as required in order to increase reliability.

(2) Camera for Photographic Film with Information Recording Portion

Figure 3:
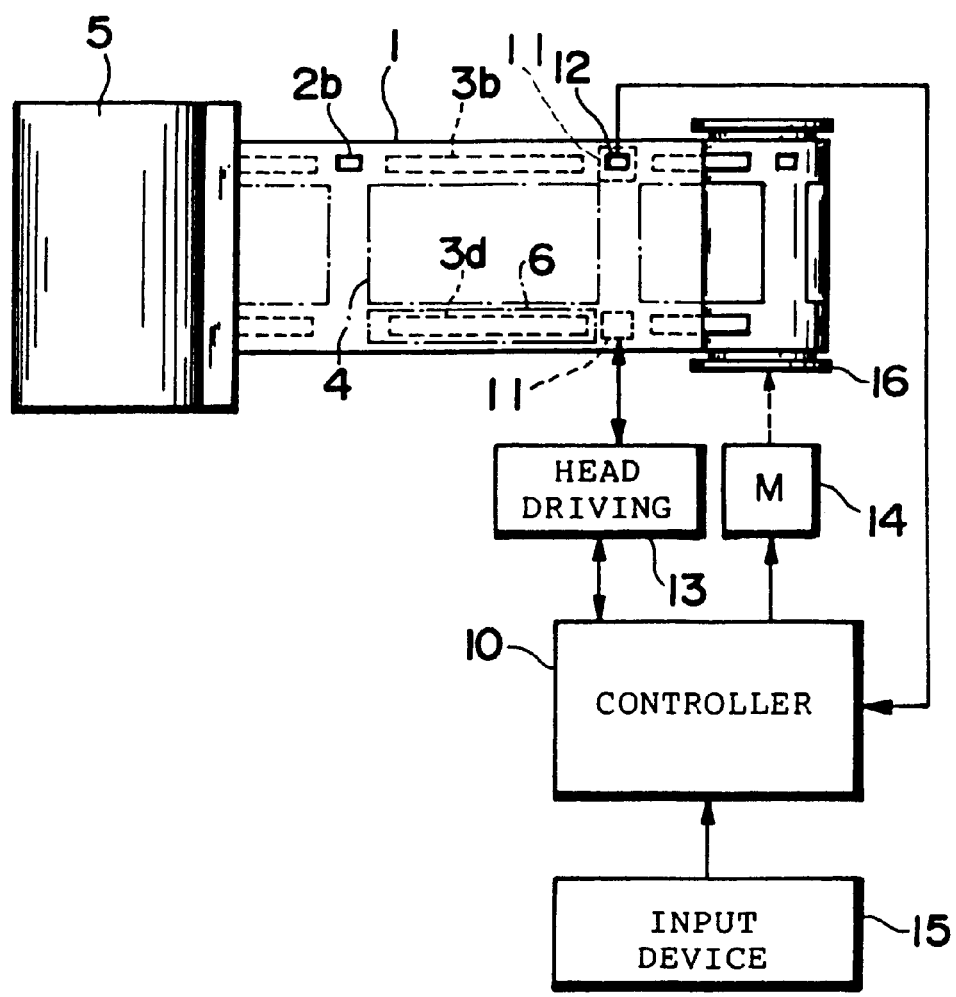
FIG. 3 illustrates part of a camera capable of handling a new (APS) photographic film having an information recording portion.

A part of the construction of a camera capable of handling such a photographic film with an information recording portion is illustrated in FIG. 3. In FIG. 3, the construction relating to recording on the magnetic information recording areas 3a, 3b, 3c and 3d of the photographic film is mainly illustrated, and the construction of an imaging optical system or the like is omitted.

The cartridge 5 is rotatably supported on a fork (not shown) in the camera. The distal end of the photographic film 1 drawn out of the cartridge 5 is wound around a photographic film winding shaft 16. A photoelectric sensor 12 for sensing the perforation 2b is provided, and its sensing signal is fed to a controller 10. The controller 10 drives a motor 14 to rotate the winding shaft 16 so that the photographic film 1 is successively wound up, and positions the photographic film 1 for each photographing so that the image recording area 4 is in the image formation position on the basis of the sensing signal of the photoelectric sensor 12.

A magnetic head 11 for recording information on the magnetic information recording areas 3c and 3d for the user is provided on a travel path of the magnetic information recording portions 3c and 3d. In the process of winding (traveling) of the photographic film 1, information entered from an input device 15 or information produced by the controller 10 are magnetically recorded on the magnetic recording areas 3c and 3d by the magnetic head 11 through a head driving circuit 13 under the control of the controller 10.

The input device 15 is for entering numerals and characters. For example, the input device 15 includes numeric keys, alphabet keys, and the like. The input device 15 includes a display device as required, and keyed information is displayed on the display device. In order to decrease the number of keys, the input device 15 can be also so constructed that a character displayed every time one key is pressed is changed, and the user can select displayed characters.

(3) Film Scanner

Figure 4:
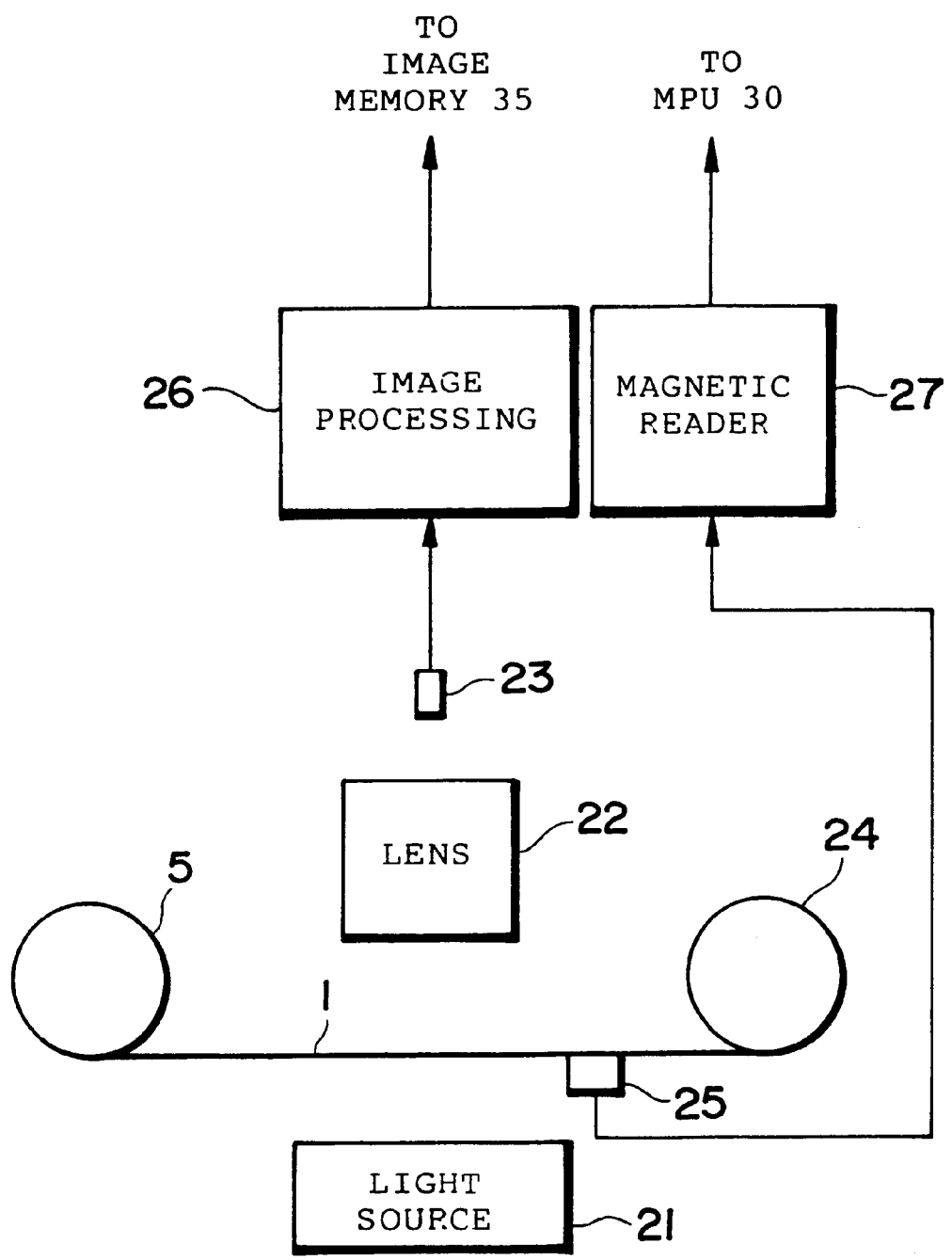
FIG. 4 illustrates the construction of a film scanner.

FIG. 4 illustrates, in simplified form, the construction of a film scanner for reading images and magnetic information that have been recorded on the new photographic film 1.

The new photographic film 1 is pulled from the cartridge 5 and is would up on a take-up shaft 24 for the photographic film. The new photographic film 1 is conveyed at a prescribed speed by a film feeding mechanism (not shown).

Light from a light source 21 irradiates the conveyed new photographic film 1. Light representing an image appearing in an image recording area of the new photographic film 1 forms an image on a CCD line sensor 23 via a lens system 22. The CCD line sensor 23 includes a number (e.g., 2048) of photoelectric transducers arrayed in a direction which perpendicularly intersects the longitudinal direction of the new photographic film 1. Video signals are sent from the CCD line sensor 23 to an image processor 26 line by line as the new photographic film 1 is fed. When the new photographic film 1 is fed by a length equal to one image recording area, one frame of image data is obtained (for example, image data having a resolution of 2048×3072 pixels is obtained when the film is fed at the finest pitch).

The image processor 26 comprises a signal processing circuit (inclusive of circuits selected from among a white balance circuit, gamma correction circuit and negative/positive reversal circuit, etc., as required) for processing a video signal (or digital image data converted by an A/D converter circuit) obtained from the CCD line sensor 23. Digital image data obtained when the new photographic film 1 has been fed by the finest or smallest pitch are referred to as original digital image data. The original image data are applied to an image memory 35, described later.

The original image data are for prints. So-called "high-vision" (high-definition) image data are obtained by reducing the original digital image data to ½ in the vertical direction and ½ in the horizontal direction. Standard image data are obtained by further reducing these high-definition image data to ½ in the longitudinal direction and ½ in the horizontal direction. Thumbnail image data are obtained by further reducing these standard image data to ⅛ in the vertical direction and ⅛ in the horizontal direction. The reduction of the image is carried out by executing subsampling processing or by executing averaging processing in units of a plurality of adjacent pixels. The reduction processing is executed by an enlarging/reducing circuit 44, described later. Image data having a different resolution can also be obtained by changing the pitch at which the new photographic film 1 is fed in the film scanner.

The film scanner shown in FIG. 4 has a magnetic head 25 provided in the conveyance path of the new photographic film 1 at a position traversed by the magnetic information recording areas 3c, 3d of the film. The magnetic head 25 reads the information magnetically recorded on the information recording areas 3c, 3d and sends the resulting read signals to a magnetic reading circuit 27 as the new photographic film 1 is being fed. A magnetic reading circuit 27 applies the required processing (demodulation, encoding, etc.) to the read signals and then applies the processed results to the MPU 30, described later.

(4) Image Filing and Printing Apparatus

Figure 5:
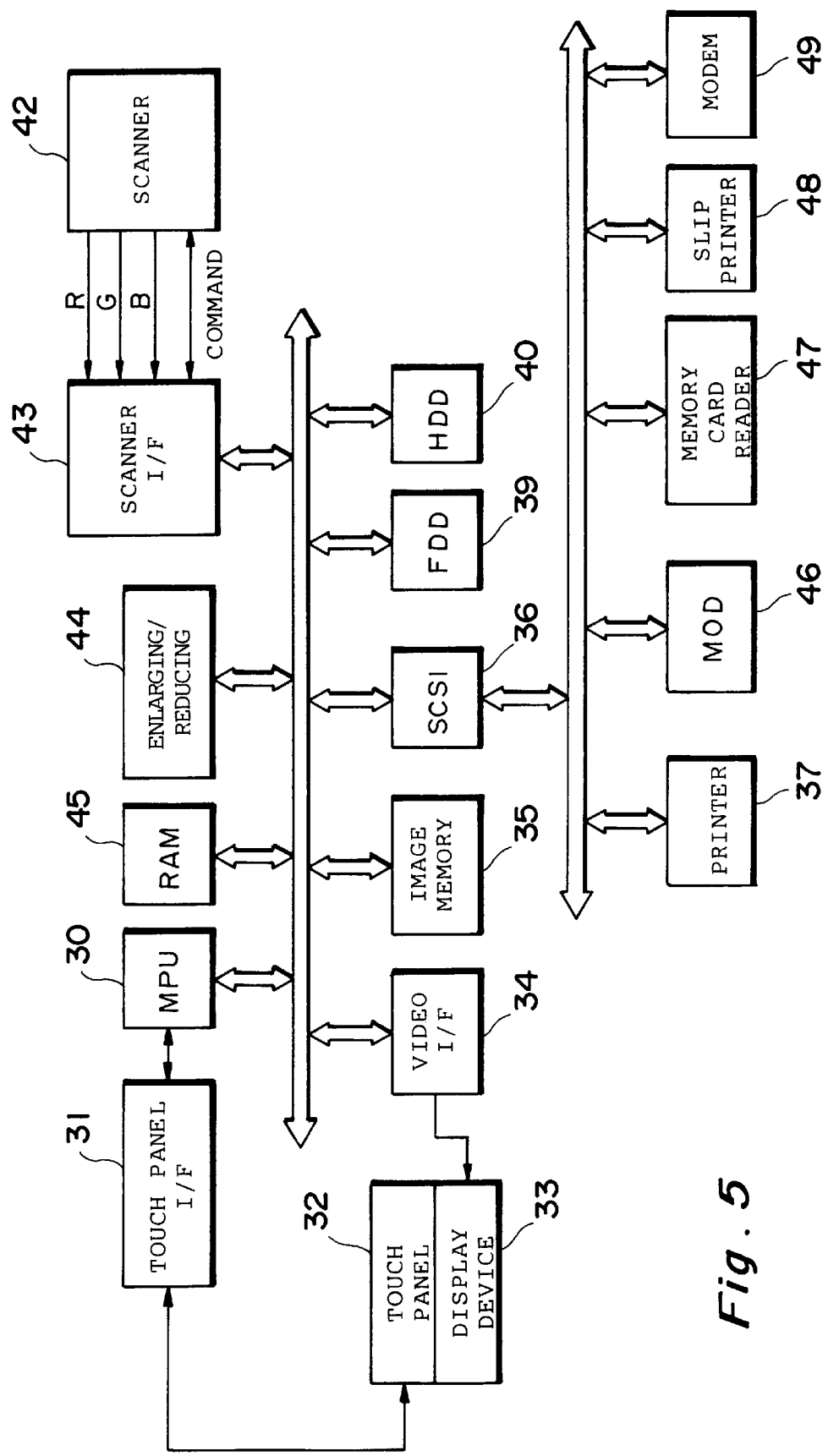
FIG. 5 is a block diagram showing the electrical construction of an image filing and printing apparatus.

FIG. 5 illustrates the electrical configuration of an image filing and printing apparatus (image filing/printing apparatus).

This image filing/printing apparatus would be installed at a variety of locations, examples of which are a film developing establishment (store), photography shop, department store, convenience store and other types of stores and shops. The image filing/printing apparatus generally is operated by the customer (user). At locations such as a film developing store where an operator is always present, the image filing/printing apparatus would be operated in its entirety by the operator.

The media handled by this image filing/printing apparatus are classified broadly into two types. The first is the media which represent images visually, such as photographic film, photographs printed on photographic printing paper and printed matter (posters and calendars having photographs thereon, etc.). These types of media are referred to as visible image media. The second is media for recording (or storing) digital data representing images, such as optical disks, magneto-optical disks, magnetic disks and memory cards. These type of media are referred to as digital media.

The image file printing apparatus has mainly two functions: a photo-joy print service (image synthesis processing) and a digital output service (image conversion processing).

In the photo-joy print service, both a visible image medium and a digital medium are used as an input medium. A print, a memory card, a magneto-optic disk, or a magnetic disk is used as an output medium. In the photo-joy print service, an image recorded on the input medium is subjected to image treatment processing such as enlarging, reducing, rotating, synthesizing on a template image, color conversion processing and so on, to be outputted.

In the digital output service, a visible image medium is used as an input medium. A digital medium is used as an output medium. In the digital output service, an image expressed on the visible image medium is read, is converted into digital image data representing the read image, and is recorded on the digital medium.

The operations of the whole of the image file printing apparatus are supervised by the MPU 30.

The image filing/printing apparatus includes a display device 33 displaying a synthesized image and other information, an interface 34 for the display device 33 (a video interface), a touch panel 32 disposed on a display screen of the display device 33 and receiving a command by the user, a touch panel interface 31, an image memory 35 temporarily storing image data, an SCSI (Small Computer System Interface) 36, a printer 37, a floppy disk drive 39 for a magnetic disk, a hard disk drive 40, a magneto-optic disk drive 46 and a memory card reader 47. The image filing/printing apparatus further has a scanner 42 reading an image expressed on a new type photographic film, a conventional type photographic film or a photograph (in a case where the new type photographic film is the input medium, the scanner 42 may have the arrangement shown in FIG. 4), a scanner interface 43, an enlarging/reducing circuit 44 for enlarging and reducing an image represented by the image data, and a RAM 45 for temporarily storing data.

Moreover, the image filing/printing apparatus comprises a slip printer 48 printing on a slip information relating to contents of the service performed using the image filing/printing apparatus (whether the service is photo-joy print service or digital output service, what kinds of image treatment processing is executed, the number of prints, etc.), and a modem 49 for transmitting data representing the contests of the service.

The user performs operations for the photo-joy print service or the digital output service in accordance with indications on the display device 33. Specifically, a touch panel 32 is formed on the display screen of the display device 33. The touch panel 32 is connected to the MPU 30 through the interface 31. A guidance (comprising illustrations, sentences, etc.) for guiding the operations and one or a plurality of sections to be touched are displayed on the display screen of the display device 33. The function of a key (including numerical values) is displayed in each of the sections. Consequently, function keys and numeric keys are realized. An input signal representing the position of the section which the operator or the user touches by his or her finger is fed to the MPU 30. The user selects the type of processing (service) (the photo-joy print service or the digital output service), designates the input medium, and designates a frame to be recorded or printed on the output medium and performs other entry utilizing the touch panel.

The scanner 42 reads images represented on the new type photographic film, the conventional type photographic film, or reflective originals such as photographs, printed matters, etc. and outputs image data representing the images, which may be constructed by combination of some kinds of scanner. The scanner 42 includes the structure of the film scanner shown in FIG. 4. The scanner 42 is connected to the MPU 30 via the scanner interface 43. If the scanner 42 is a scanner for the conventional type photographic film, the scanner 42 would include a light source, an image sensing optical system, a line sensor (or two-dimensional image sensing device), a mechanism for transporting the film or line sensor, a signal processing circuit and an A/D converter circuit, etc. A flat-bed scanner may serve as a scanner for reflective originals. The flat-bed scanner is equipped with a flat bed. A reflective original is placed upon the flat bed. Light from the light source is projected upon the reflective original and light reflected from the reflective original enters the line sensor or two-dimensional image sensing device. A video signal outputted by the line sensor or image sensing device is subjected to prescribed processing and then outputted as digital image data.

The RAN 45 temporarily stores data. The image memory 35 stores image data read by the scanner 42, the drive 39, 40 or 46 for disks, or the memory card reader 47. The enlarging/reducing circuit 44 enlarges or reduces an image represented by image data. The enlarging/reducing circuit 44 also executes compression and decompression (expansion) processing of the image data.

The hard disk drive 40 writes data to a hard disk and reads out data that have been recorded on the hard disk.

The floppy disk drive 39, magneto-optical disk drive 46 or memory card reader 47 writes data inclusive of image data to a floppy disk, magneto-optical disk or memory card, respectively, serving as output media, reads data from the floppy disk, magneto-optical disk or memory card, or rewrites the data.

The printer 37 prints images represented by image data applied thereto.

(5) File Structure of Hard Disk

Figure 6:
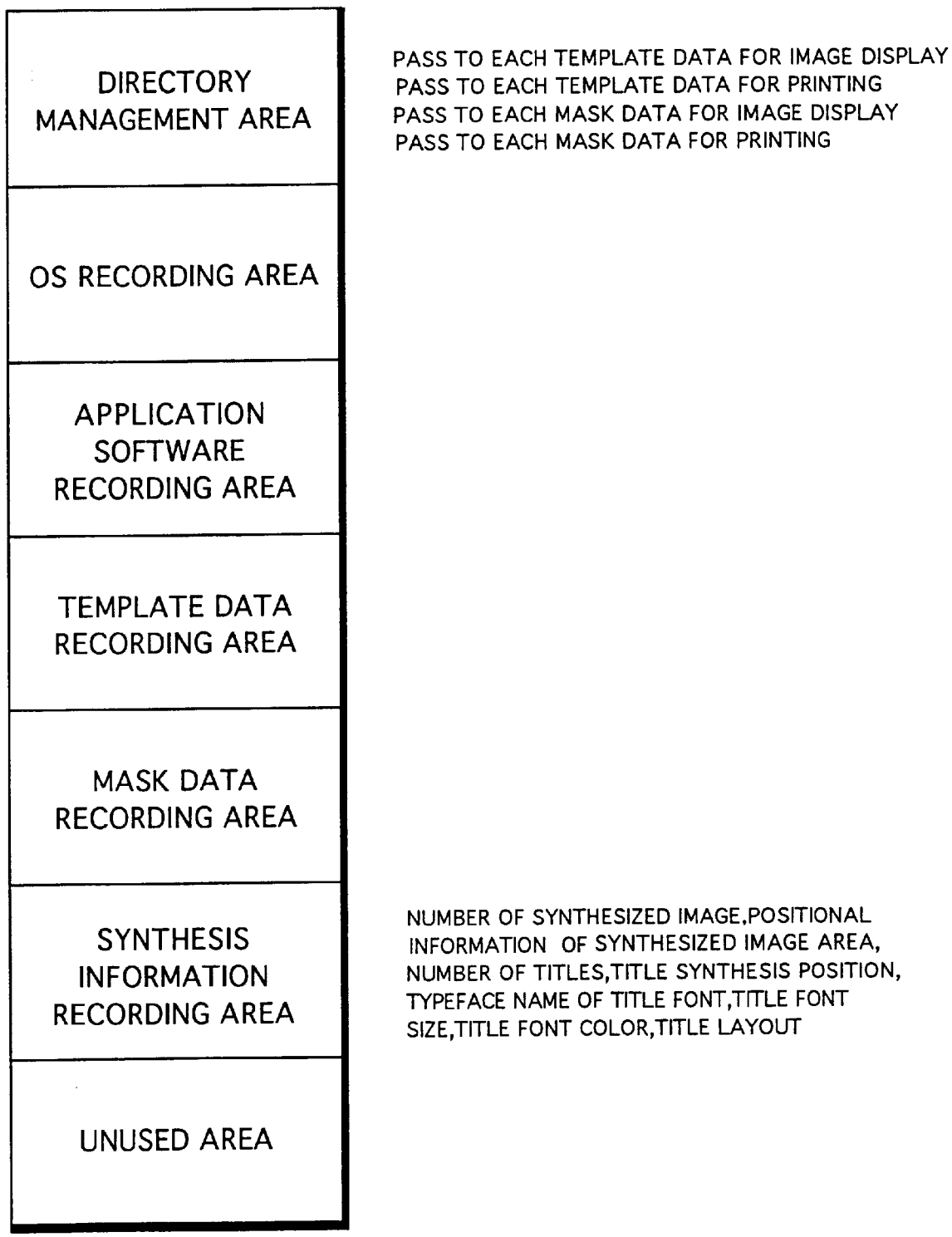
FIG. 6 illustrates the file structure of a hard disk included in the image filing and printing apparatus.
Figure 7:
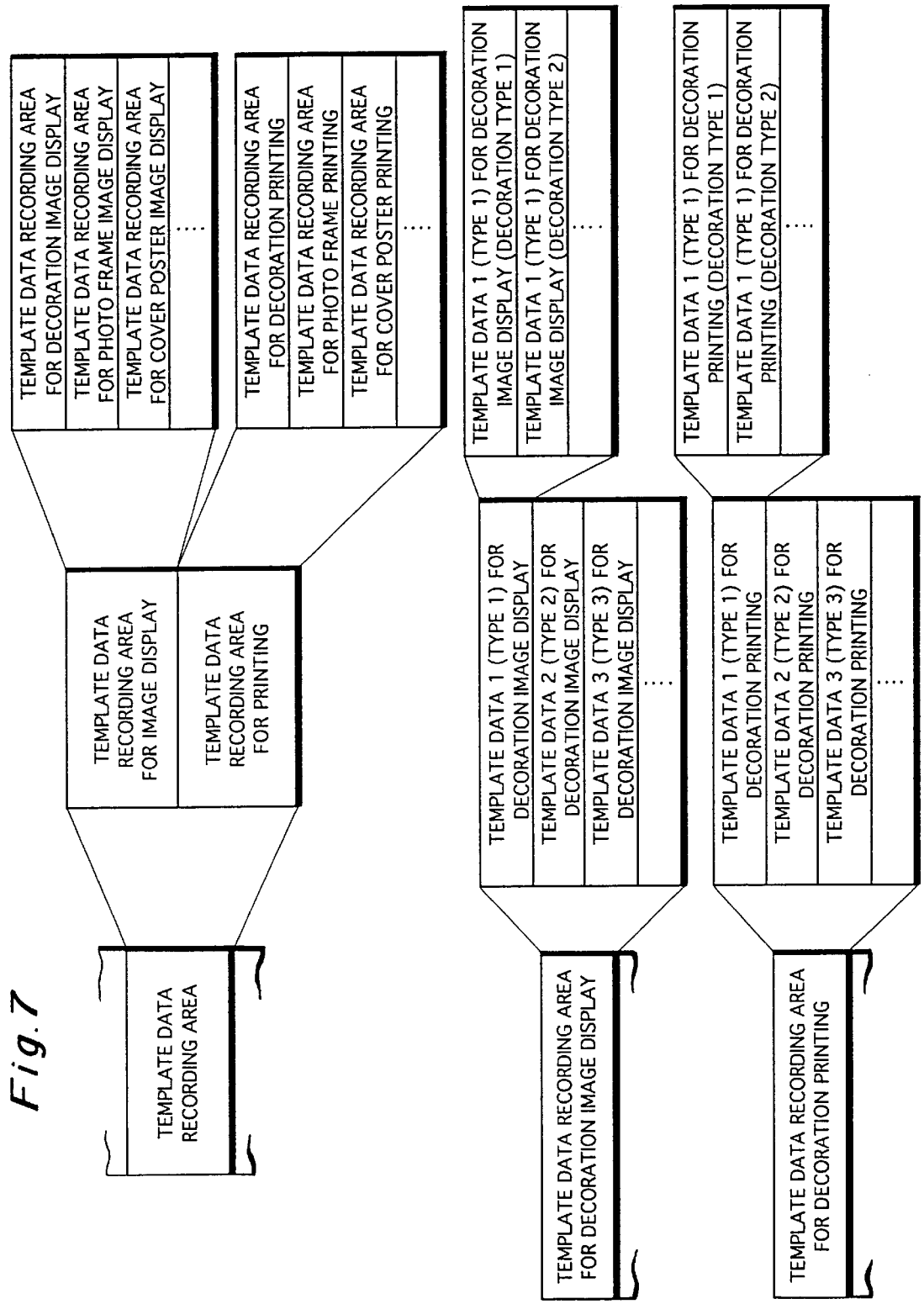
FIG. 7 illustrates the contents of a template image data storage area.
Figure 8:
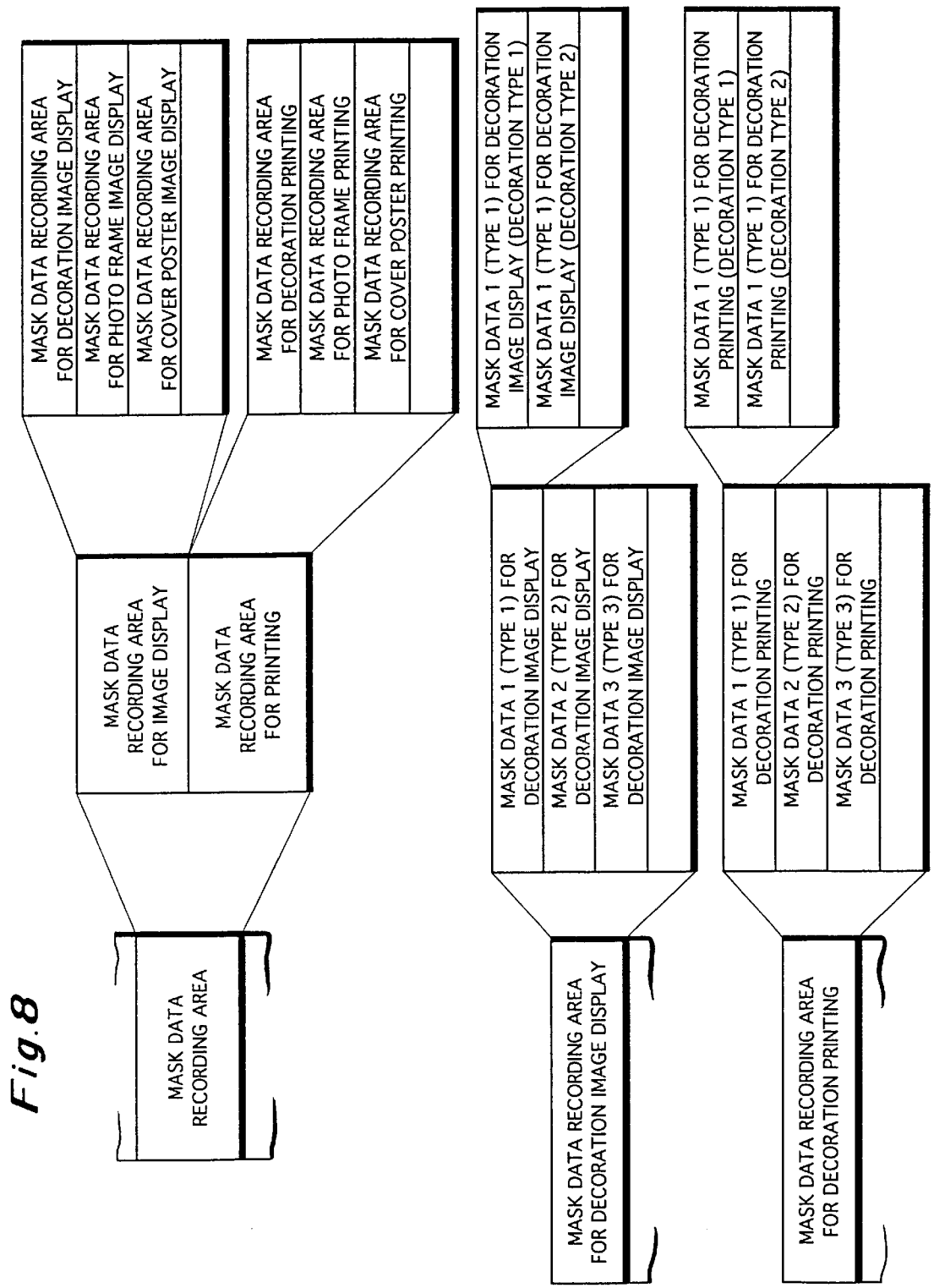
FIG. 8 illustrates the contents of a mask image data storage area.

FIGS. 6 to 8 illustrate a file structure (a data structure) of a hard disk included in the image filing/printing apparatus. This illustrates not the physical structure but the logical file structure. Various data shown in FIGS. 6 and 8 may be not a continuous gathered state but a dispersed state. When there are a plurality of hard disks on the image synthesizer, all data shown in FIGS. 6 to 8 need not exist on one hard disk. The data may be recorded in a dispersed manner on the plurality of hard disks.

The hard disk includes a directory management area where all the data stored in the hard disk are managed, an OS recording area on which an OS (Operating System) is recorded, an application software recording area on which software for a photo-joy print service and a digital output service is recorded, a template data recording area on which template image data representing a template image which is a background image of a subject image to be synthesized is recorded, a mask data recording area on which mask image data representing a mask image for defining a synthesis position and a synthesis area of the subject image to be synthesized on the template image is recorded, a synthesis information recording area storing synthesis information utilized for image synthesis, and an unused area.

FIG. 7 illustrates the details of the template data recording area.

Template image data includes template image data for image display used when a composite image displayed on the display screen of the display device 33 is produced, and template image data for printing used when the composite image is printed using the printer 37 and having higher resolution than that of the template image data for image display. Therefore, the template data recording area includes a template image data recording area for image display and a template image data recording area for printing. The template image data for image display and the template image data for printing are respectively stored in the template image data recording area for image display and the template image data recording area for printing.

In the image filing/printing apparatus according to the present invention, one kind of template image is selected among a plurality kinds of template images. A subject image is synthesized on the selected template image. Therefore, each of the template image data recording area for image display and the template image data recording area for printing is further divided into recording areas depending on the kind of template image (for example, a template image data recording area for decoration image display, a template image data recording area for photo frame image display, etc.). Template image data corresponding to the kind of template is stored in each of the areas.

Furthermore, the same kind of template includes a plurality of types of templates. For example, a decoration template includes types depending on the number of subject images and whether the subject images are displayed longitudinally or laterally (type 1, type 2, etc.). Template image data is stored for each type.

Further in the image filing/printing apparatus according to the present invention, the same type of template further includes a plurality of different decoration types. For example, when the type of template is a decoration template, and subject images of three frames are laterally arranged, there are different decoration types (for example, a decoration for a wedding ceremony, a decoration for an entrance ceremony, etc.). Template image data is stored for each decoration type.

Consequently, a template is defined by the kind, type and decoration type.

FIG. 8 illustrates the details of the mask data recording area.

The mask image data are classified into kinds, types and decoration types respectively corresponding to the kinds, the types and the decoration types of the template image data, and there are provided areas on which the respective data are to be recorded.

The template image data and the mask image data are respectively recorded on the template data recording area and the mask data recording area in the form of bit map data upon being compressed.

Referring to FIG. 6 again, the directory management area stores a pass to each of the template image data for image display (a pass is information required for a computer to access a storage location storing each data), a pass to each of the template image data for printing, a pass to each of the mask image data for image display, a pass to each of the mask image data for printing, and the other data. The respective image data can be accessed by referring to the passes stored in the directory management area.

The synthesis information recording area stores information utilized for image synthesis. Examples of the synthesis information include the number of synthesized images, positional information of a synthesized image area, the number of titles, a title synthesis position, the typeface name of a title font, the title font size, the title font color, and the title layout.

The number of synthesized images represents the number of subject images to be synthesized on a template image. The positional information of the synthesized image area represents the position and the size of the synthesis definition range which define the size required for the subject image to be synthesized on the template image (as described in detail later). The number of titles represents, when titles are added to the template image as described later, the number of the titles. The title synthesis position represents, when a title is added to the template image, the position where the title is started (as described in detail later). The typeface name of a title font indicates whether the title is Roman, Gothic, italics or the like. The title font size represents the size of a font used for the title. The title font color represents a color of the title. The title layout indicates whether the title is put to the left side, centered or put to the right side.

Such synthesis information is stored as code data on the synthesis information recording area in correspondence to the template image data finally defined in terms of the combinations of kind, type and decoration type.

FIG. 9a illustrates an example of a template image. FIG. 9b illustrates an example of a mask image. FIG. 19c illustrates an example of synthesis information. Template image data representing such template image as illustrated is stored in the template data recording area, mask image data representing such mask image as illustrated is stored in the mask data recording area, and data representing such synthesis information as illustrated is stored in the synthesis information recording area.

Figure 10:
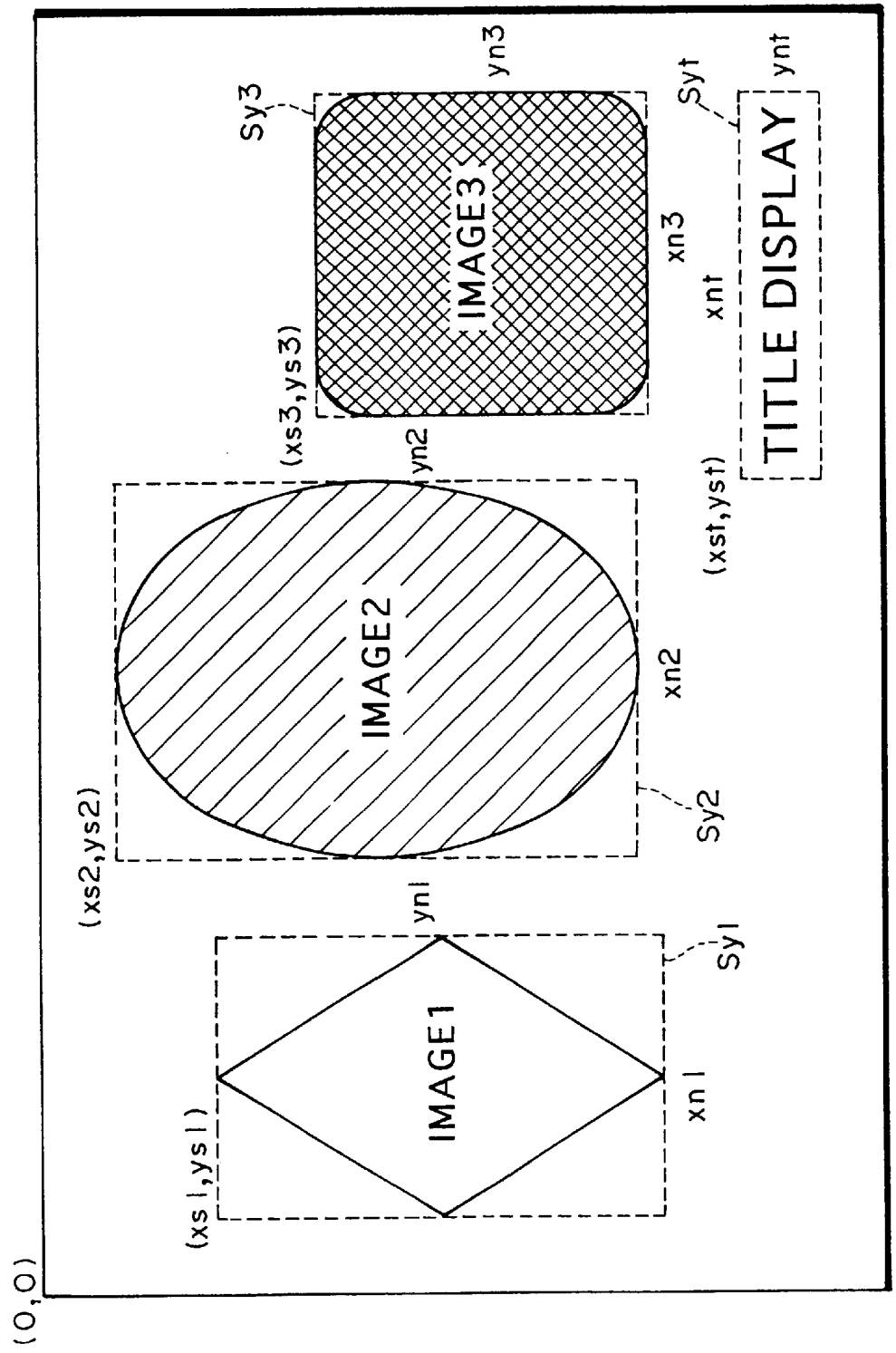
FIG. 10 illustrates the relationship between the position of a synthesis definition range as well as a title synthesis position and a template image.
Figure 11:
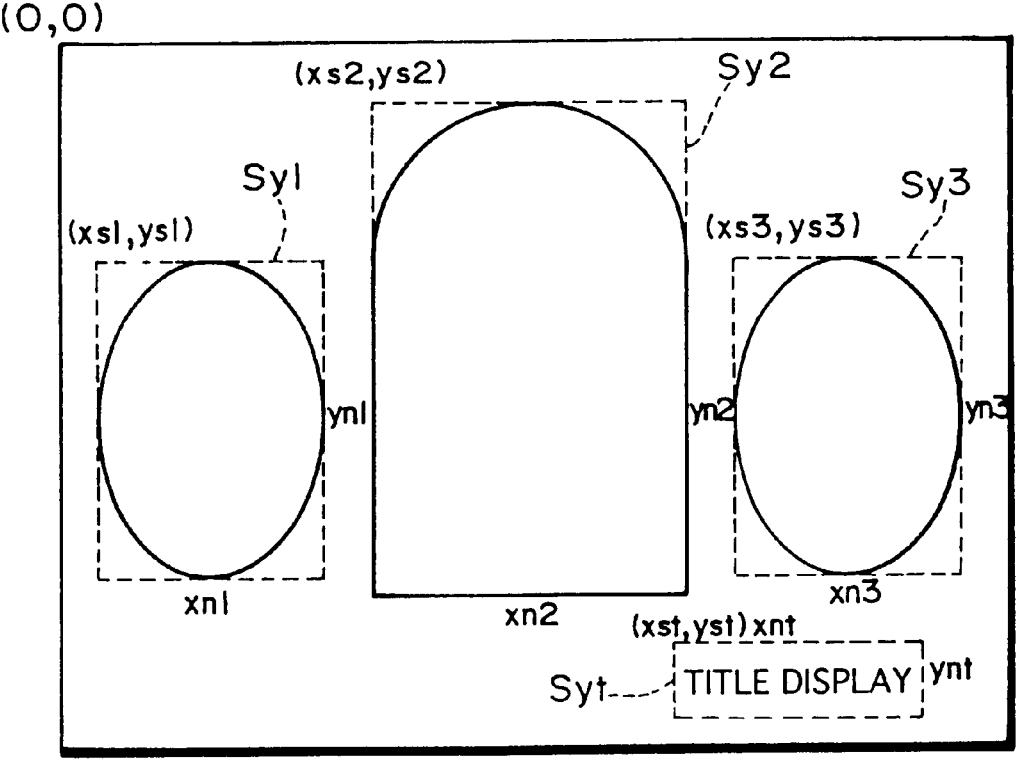
FIG. 11 illustrates the relationship between the position of a synthesis definition range as well as a title synthesis position and a template image.

FIGS. 10 and 11 are diagrams for explaining the positional information of the synthesized image area and the information of the title synthesis position which are included in the synthesis information. The positional information of the synthesized image area and the information of the title synthesis position respectively include the start position and the size of a synthesis definition range $S_{yn}$ (n denotes the number of the synthesis definition range, 1 to 3 in an example shown in FIGS. 10 and 11). The start position is indicated by coordinates (xsf, ysf) (f also denotes the number of the synthesis definition range, 1 to 3 in the example shown in FIGS. 10 and 11) at the upper left corner of the synthesis definition range $S_{yn}$ in a case where the upper left corner of the template image is taken as the origin (0, 0). Further, the size of the synthesis definition range $S_{yn}$ is indicated in such a way that the length in the horizontal direction is represented by xnf, and the length in the vertical direction is represented by ynf (f denotes the number of the synthesis definition range).

If the size of a subject image to be synthesized on the template image is smaller than the size of the corresponding synthesis definition range, a white edge or a black edge appears on a composite image. When the size of the subject image is smaller than the size of the synthesis definition range, therefore, the fact is notified. Therefore, a white edge or a black edge can be prevented from being formed on the composite image when the size of the subject image to be synthesized on the template image is smaller than the size of the synthesis definition range.

(6) Image Synthesis

Figure 12:
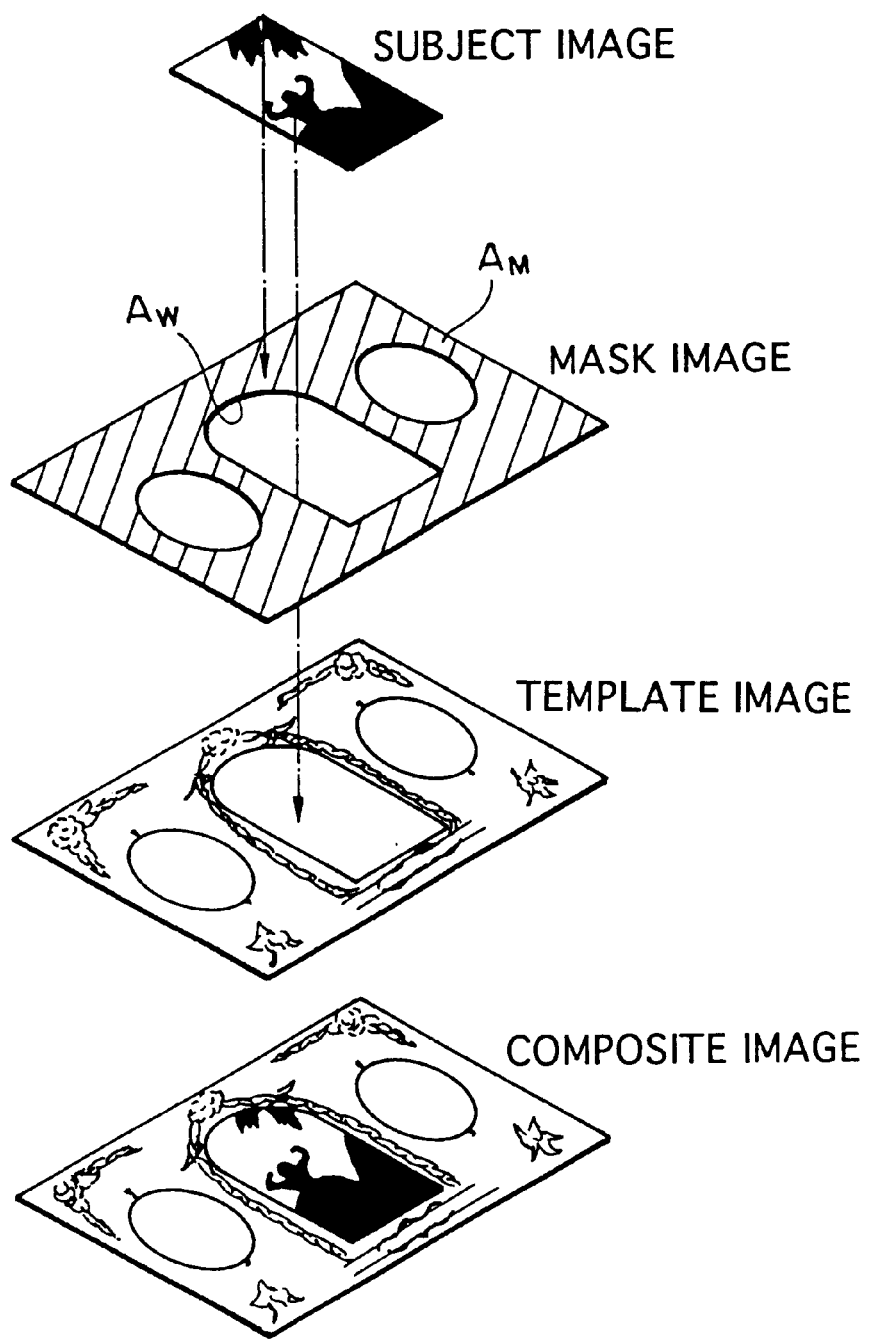
FIG. 12 is a perspective view for explaining image synthesis.

FIG. 12 illustrates in perspective the relationship among a template image, a mask image, a subject image to be synthesized, and a composite image in order to explain image synthesis processing.

In the image synthesis, the template image is selected, and template image data representing the selected template image is read out from the hard disk. Further, mask image data corresponding to the selected template image data is read out from the hard disk. Subject image data representing the subject image to be synthesized is read out from the visible image medium or the digital medium which is brought by the user.

When the subject image to be synthesized and the mask image are overlapped with each other, the subject image in a portion corresponding to a synthesis area portion $A_W$ (other than a mask portion $A_M$ indicated by hatching) is synthesized (overlaid) on the template image, to produce the composite image. The subject image in a portion corresponding to the mask portion $A_M$ is not synthesized on the template image. The positional relationship between the synthesis area portion $A_W$ of the mask image and the subject image to be synthesized is adjusted by the user operating the image filing/printing apparatus.

(7) Disposition of Image Filing/Printing Apparatus

Figure 13:
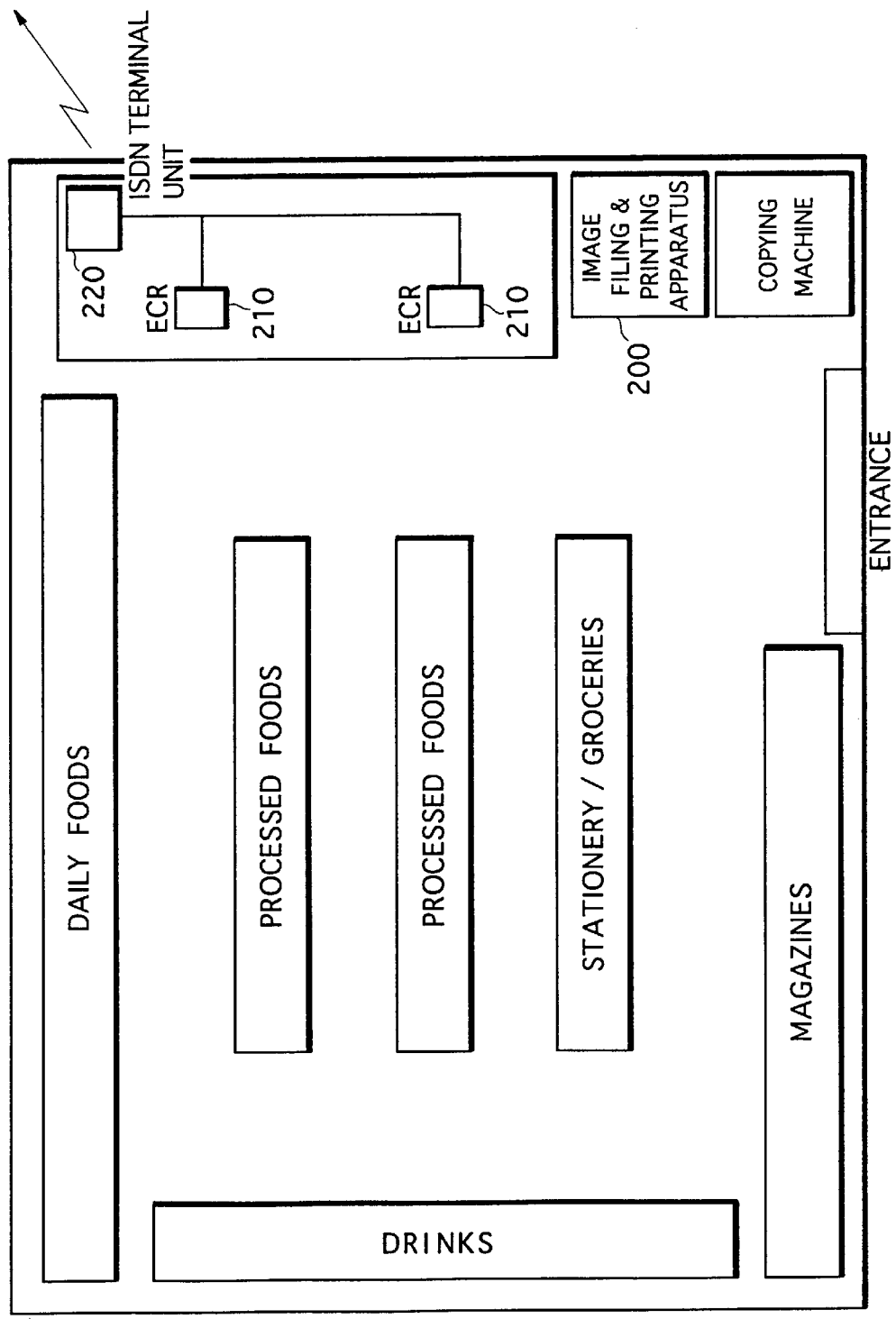
FIG. 13 is a plane view of a convenience store where the image filing and printing apparatus is placed.
Figure 14:
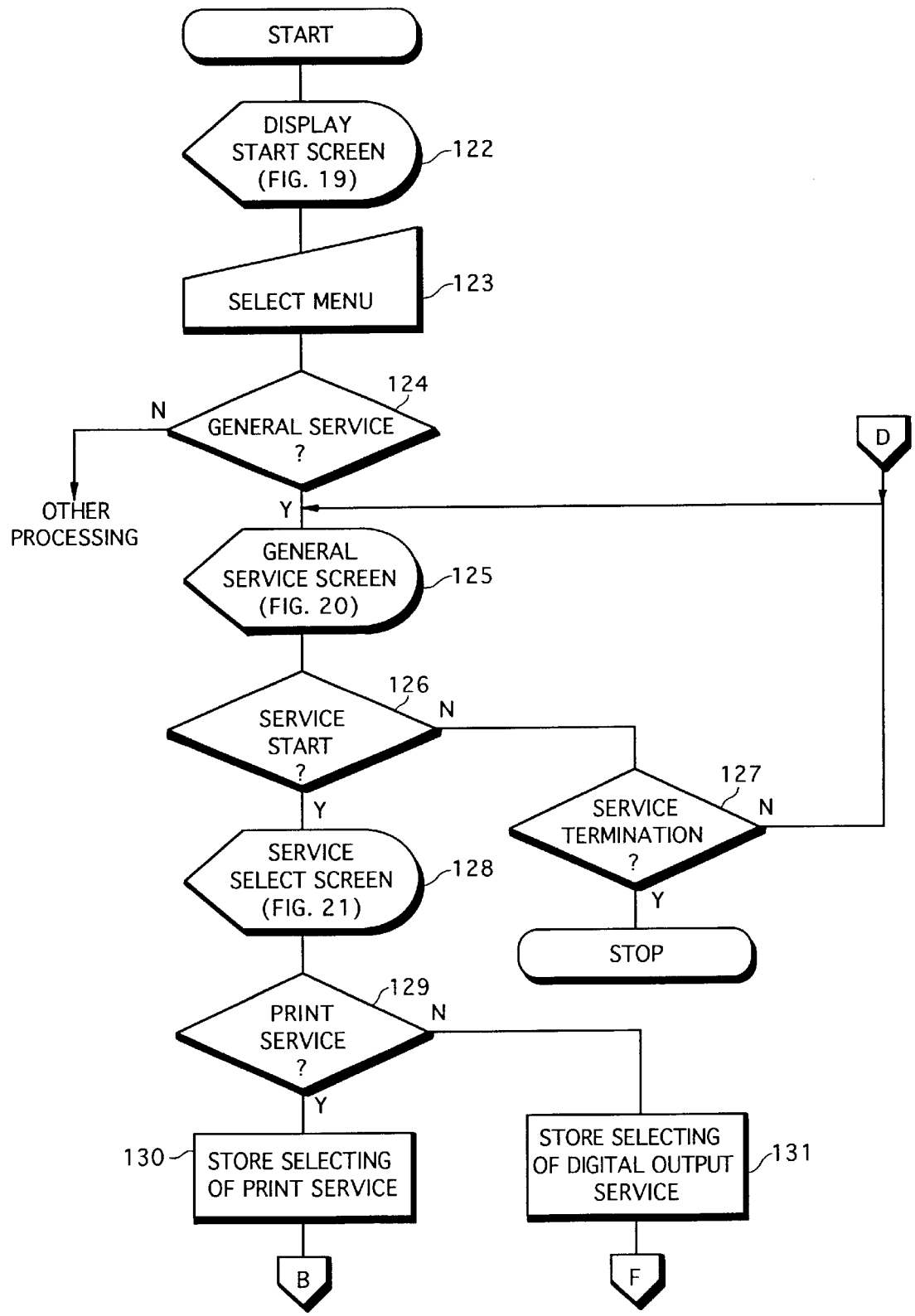
FIGS. 14 to 18 are flow charts showing the procedure for processing in the image filing and printing apparatus.

FIG. 13 shows a plane view of a convenience store where an image filing/printing apparatus is arranged.

The image filing/printing apparatus is not always disposed at a place where a clerk of the store can view due to a limited size of the store. In general, locations for foods, groceries, drinks, stationery and magazines to be placed, which need large areas, are first determined, then the image filing/printing apparatus is disposed at a remaining area.

Figure 35:
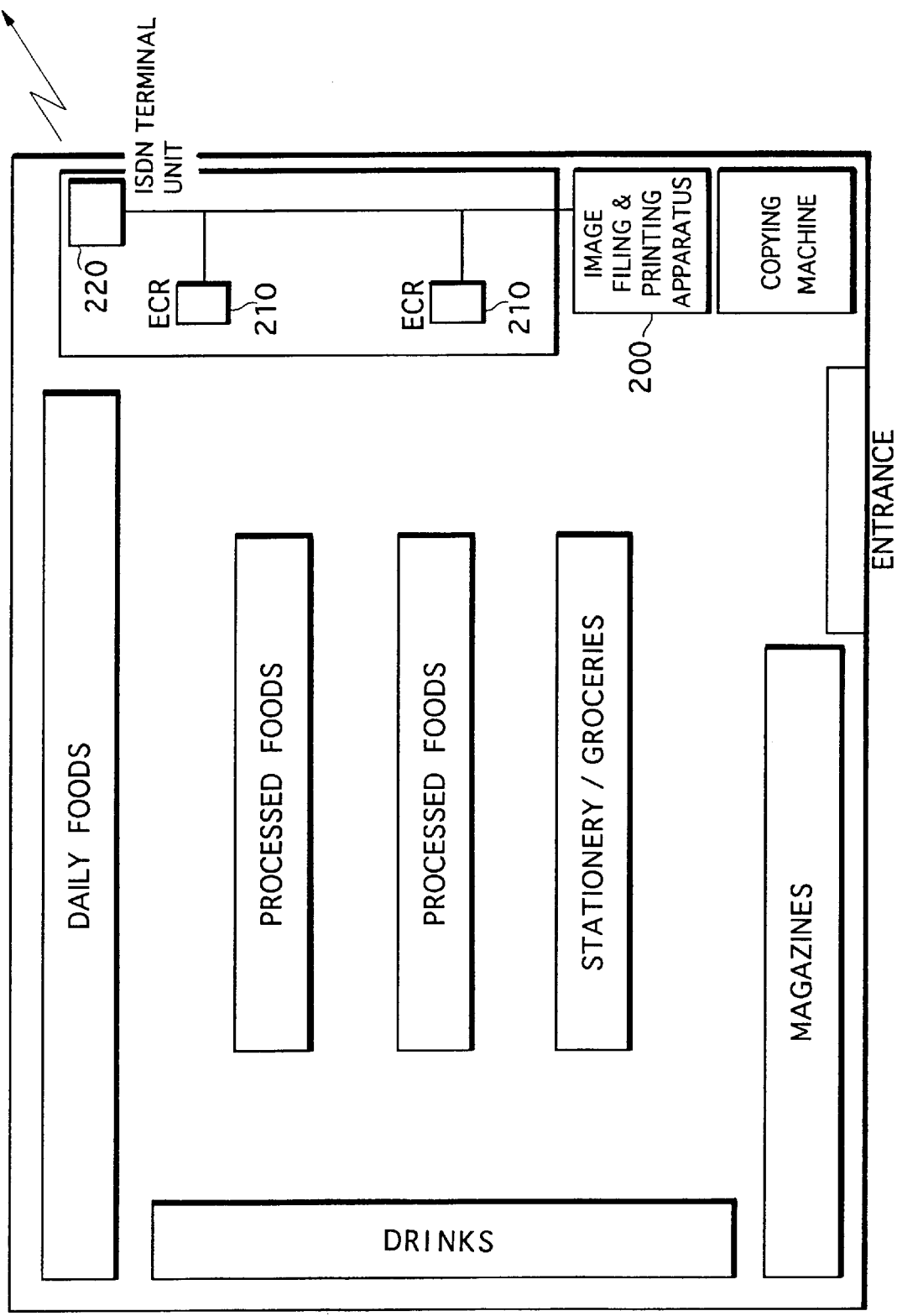
FIG. 35 is a plane view of a convenience store where an on-line image filing and printing apparatus is disposed.

In the example shown in FIG. 13, the image filing/printing apparatus 200 is placed near the entrance of the convenience store (the image filing/printing apparatus 200 and an Electronic Cash Register (ECR) 210 are not connected to each other. However, as shown in FIG. 35, the image filing/printing apparatus 200 and the ECR 210 may be connected on line to each other). The clerk of the store operates the ECR 210 to register sales, but does not see the customer using the image filing/printing apparatus 200, so that he or she cannot realize the contents of the service offered to the customer by the image filing/printing apparatus 200. The image filing/printing apparatus 200 according to the present embodiment issues a slip carrying information printed thereon and relating to the contents of the service that the customer has received using the image filing/printing apparatus 200. The customer shows or hands the printed slip over the clerk of the store. The clerk can know the contents of the service the image filing/printing apparatus 200 offers to the customer, and can charge the customer for the service to receive the corresponding amount of money and to register the sales in the ECR 210.

(8) Various Processing in Image Filing/Printing Apparatus

FIGS. 14 to 18 are flow charts showing the procedure for various processing including a photo-joy print service, a digital output service and the like in the image filing/printing apparatus 200. The details of such services are described in the U.S. patent application Ser. No. 08/736,727. FIGS. 19 to 33 illustrate examples of displays appearing on the screen of the display device 33 of the image filing/printing apparatus 200. Data causing the displays on the screen of the display device 33 are stored in the application software recording area so long as it is not emphatically mentioned. FIGS. 34$a$ to 34$e$ show examples of slip issued by the slip printer 48.

① Initialization and Service Selection

Figure 19:
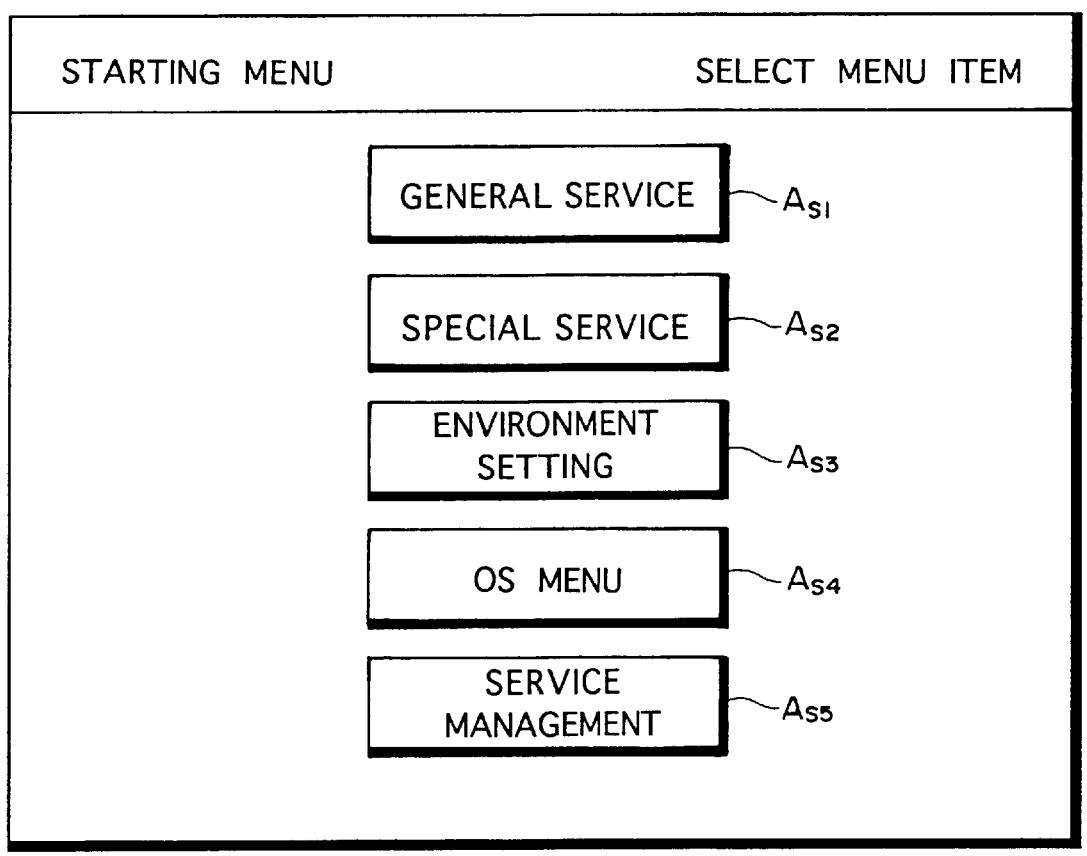
FIGS. 19 to 33 illustrate examples of display screens appearing on the screen of a display device in the image filing and printing apparatus.

In the initial state, a start screen as shown in FIG. 19 is displayed on the display device 33 (step 122). The start screen includes sections $A_{S1}$ to $A_{S5}$. When the finger of the maintenance man touches the section $A_{S1}$, the program proceeds to various service processing (a photo-joy print service, a digital output service, etc.) as described later. When the finger of the maintenance man touches the section $A_{S2}$, the program proceeds to various maintenance processing such as adjustment of the color of an image displayed on the display device 33. When the finger of the maintenance man touches the section $A_{S3}$, the program proceeds to identification number setting processing. When the finger of the maintenance man touches the section $A_{S4}$, the program proceeds to OS menu display. When the finger of the maintenance man touches the section $A_{S5}$ the program proceeds to service management processing such as totalization of the executed service and display thereof.

Figure 20:
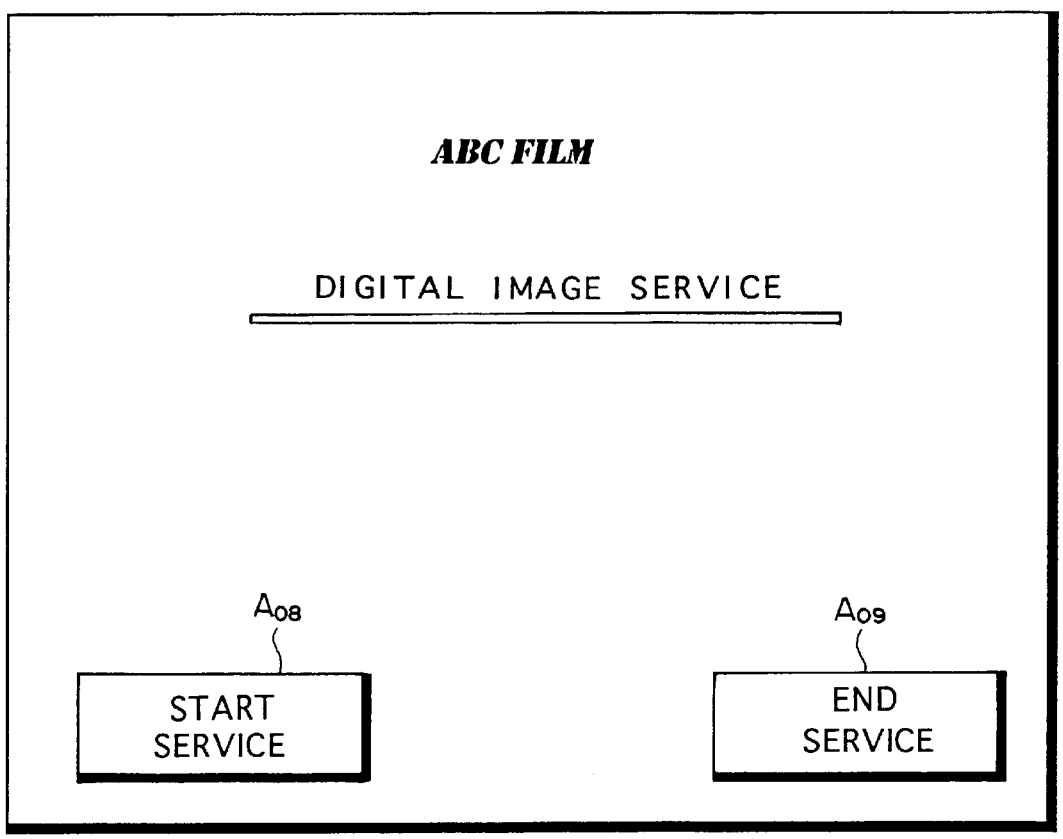

When the finger of the maintenance man touches the section $A_{S1}$ (step 123, YES in step 124), a general service screen shown in FIG. 20 is displayed on the display device 33 (step 125).

Figure 21:
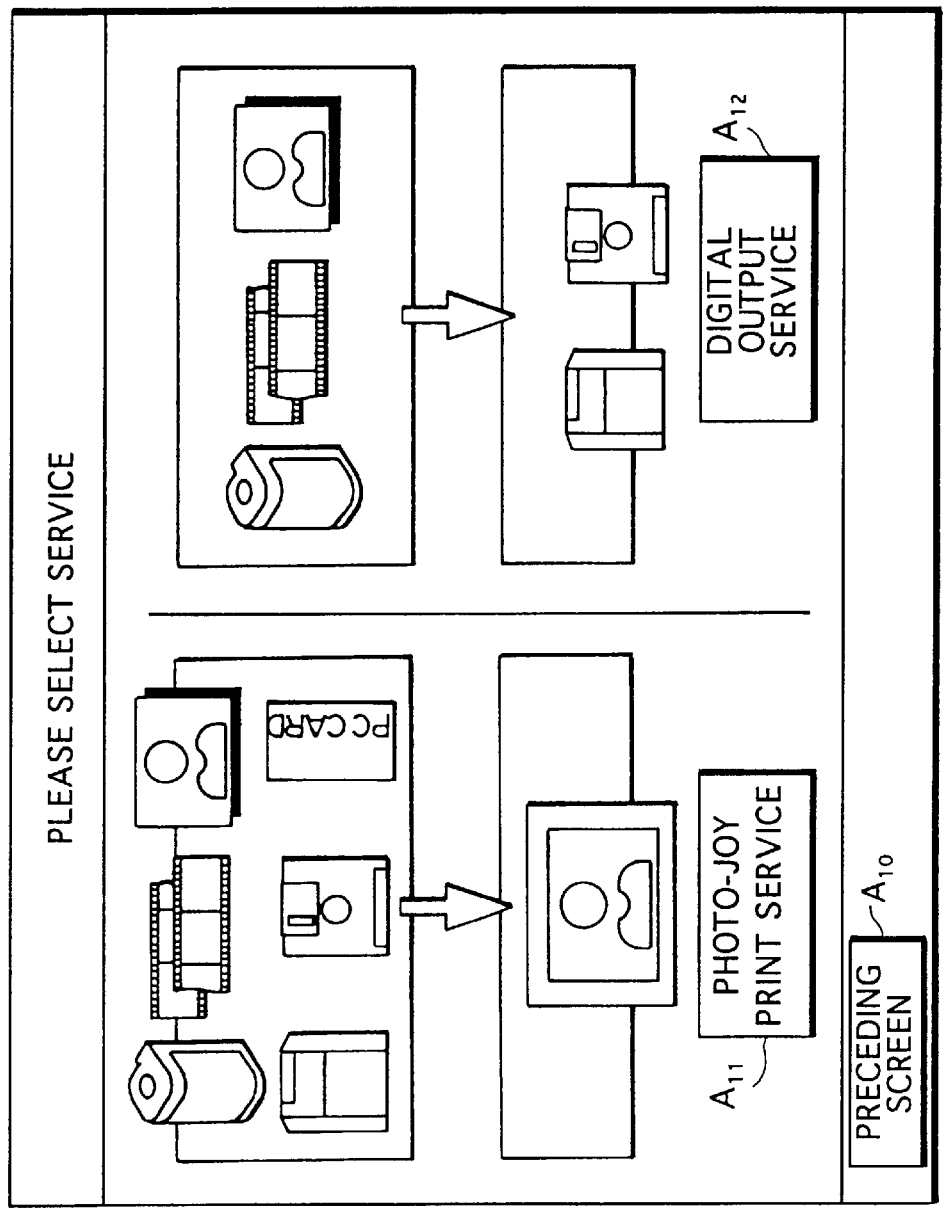

The general service screen includes a section $A_{08}$ touched by the finger of the maintenance man (or the operator or the clerk of the store) when the processing is started in the image filing/printing apparatus and a section $A_{09}$ touched by the finger of the maintenance man (or the operator or the clerk of the store) when the processing is terminated. When the section $A_{08}$ is touched by the finger of the maintenance man (or the operator or the clerk of the store), a service selection screen as shown in FIG. 21 is displayed (YES in step 126, step 128). If the section $A_{09}$ is touched, the service will be terminated (NO in the step 126, YES in step 127).

Figure 22:
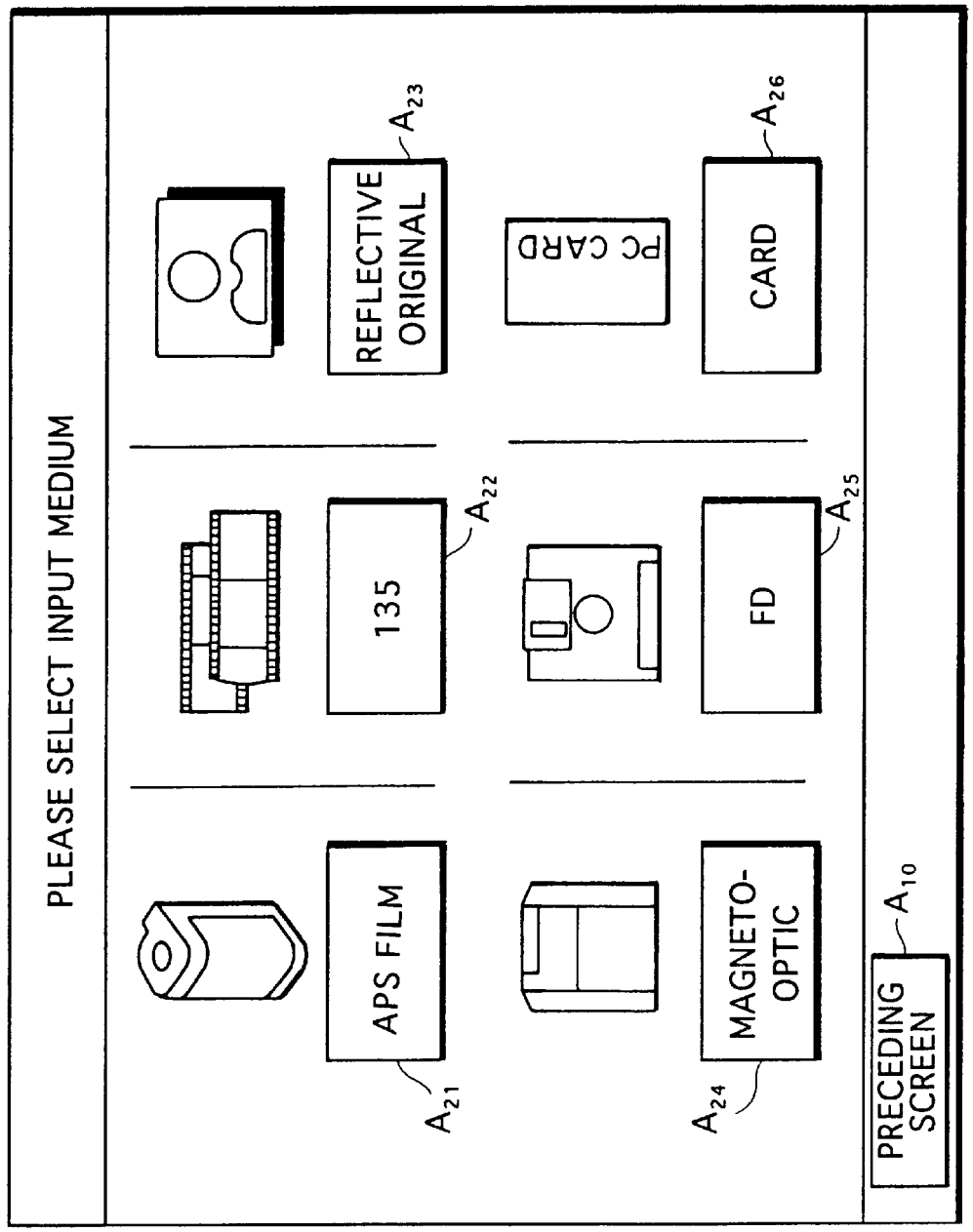

Three sections $A_{10}$, $A_{11}$ and $A_{12}$ enclosed by frames are displayed on the service selection screen. When the section $A_{11}$ out of the sections $A_{10}$, $A_{11}$ and $A_{12}$ is touched by the user (customer), the photo-joy print service is started, whereby the screen of the display device 33 is switched to an input medium selection screen as shown in FIG. 22 (step 129, step 51 in FIG. 15). The fact the photo-joy print service has been selected is stored in the RAM 45 (step 130).

In FIG. 21, when the digital output service is desired to be performed in the image filing/printing apparatus 300, the section $A_{12}$ is touched by the user (customer). In the case where the section $A_{12}$ is touched, the input medium selection screen as shown in FIG. 22 is also displayed (step 81 in FIG. 17). The fact that the digital output service has been selected is stored in the RAM 45 (step 131). The section $A_{10}$ is touched by the user when the display is returned to the preceding screen.

② Photo-Joy Print Service

The photo-joy print service is started when the section All is touched in the service selection screen shown in FIG. 21.

Referring to FIG. 22, sections $A_{21}$, $A_{22}$, $A_{23}$, $A_{24}$, $A_{25}$ and $A_{26}$ enclosed by frames are displayed on an input medium selection screen. The section $A_{21}$ is a section touched by the user when the input medium is a new type (APS) photographic film with an information recording portion, the section $A_{22}$ is a section touched by the user when the input medium is a photographic film of a conventional type, the section $A_{23}$ is a section touched by the user when the input medium is a reflective original, the section $A_{24}$ is a section touched by the user when the input medium is a magneto-optic disk, the section $A_{25}$ is a section touched by the user when the input medium is a magnetic disk, and the section $A_{26}$ is a section touched by the user when the input medium is a memory card.

Figure 15:
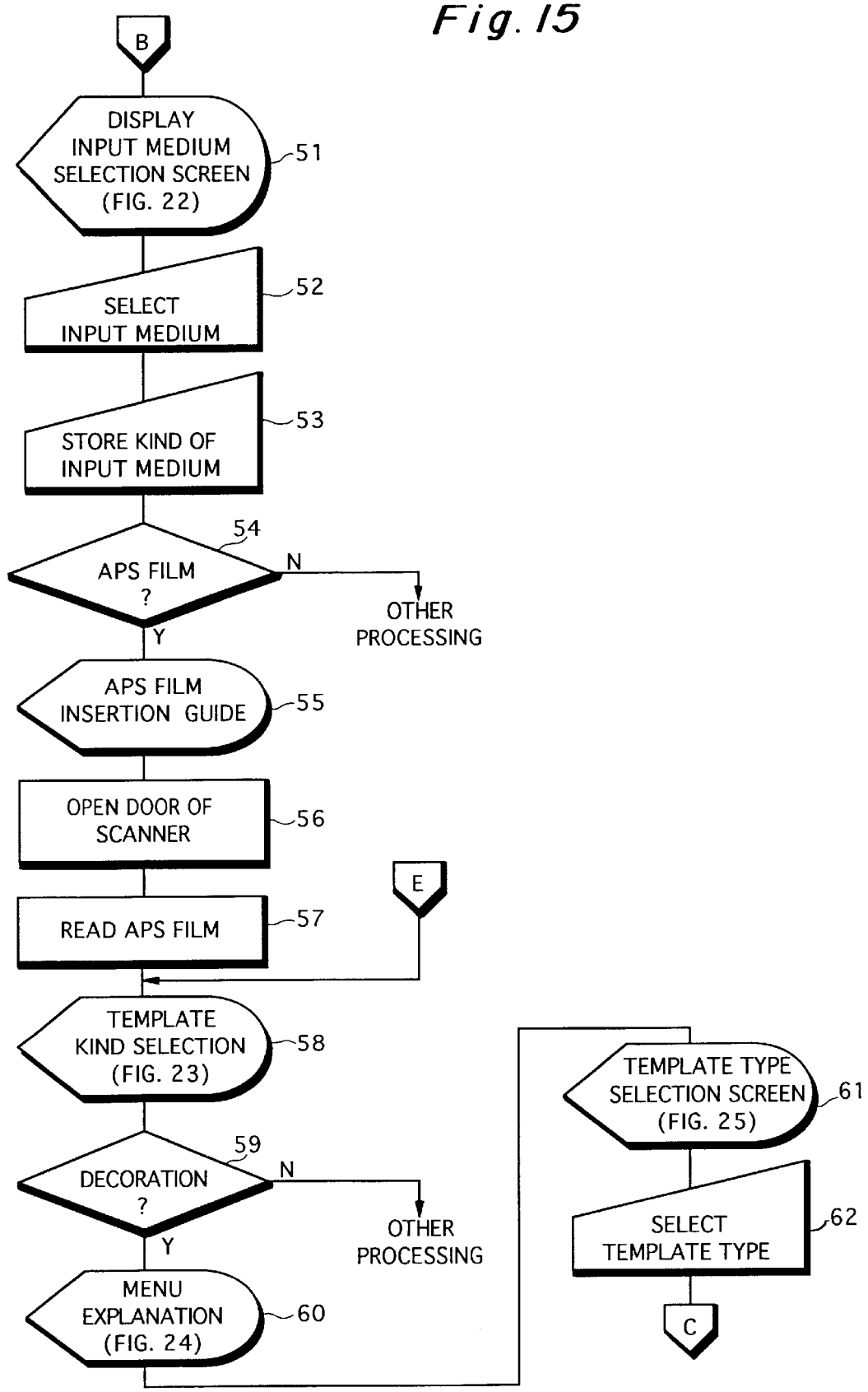
Figure 16:
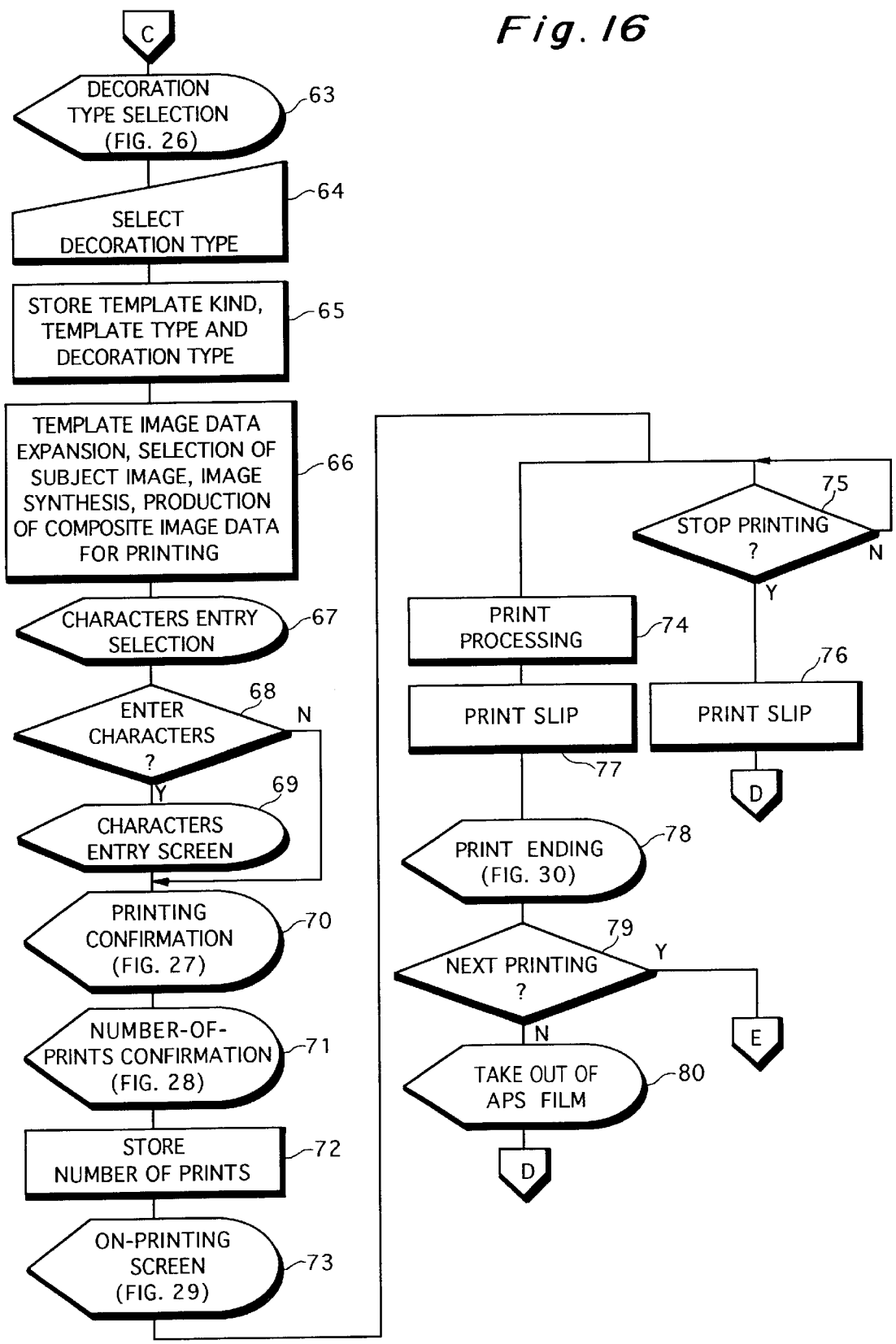

With reference to FIGS. 15 and 16, the section conforming to the input medium out of the sections $A_{21}$ to $A_{26}$ is touched by the user (step 52). The input medium is mounted in one, which is suitable for the input medium, of the scanner 42, the floppy disk drive 39, the magneto-optic disk drive 46 and the memory card reader 47. The data indicative of the kind of the selected input medium is stored in the RAM 45 (step 53).

It is assumed herein that the APS (new type) photographic film with an information recording portion is selected as the input medium upon touching of the section $A_{21}$ by the user (YES in step 54). When the APS photographic film is selected as the input medium, a guide for inserting the APS photographic film into the image filing/printing apparatus is displayed on the display device 33 (step 55) and a door of a film accommodating portion of the scanner 42 is opened (step 56). The user closes the door of the scanner 42 by hand after insertion of the APS photographic film into the scanner 42.

All images recorded on the APS photographic film mounted in the film scanner 42 are read (step 57). Image data representing the read image is thinned out in the enlarging and reducing circuit 44, to obtain image data representing a reduced image. The image data representing the reduced image is stored in the hard disk (the hard disk drive 40).

Figure 23:
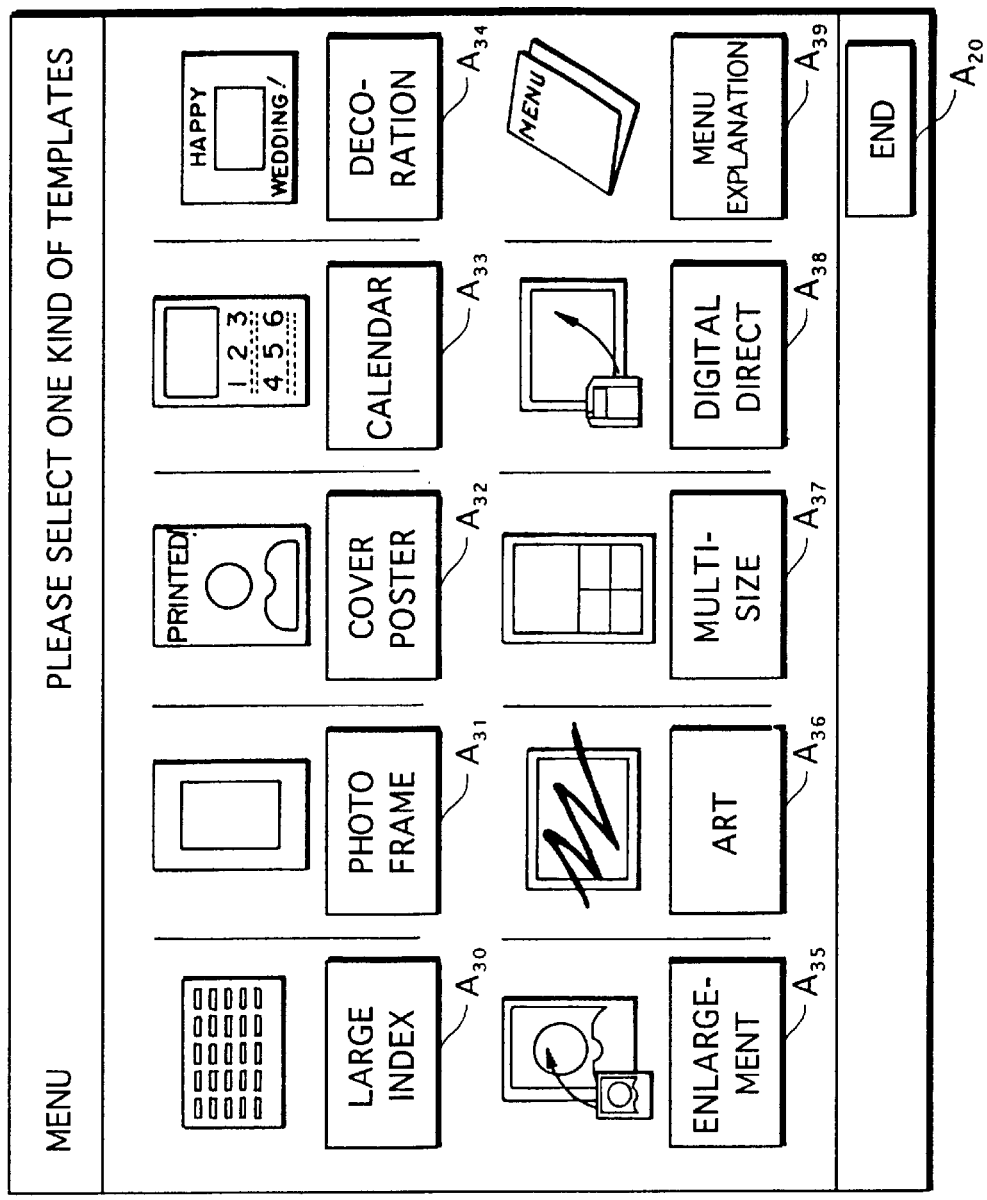

When the APS film has been inserted into the scanner 42 (the door has been closed), the display screen of the display device 33 is changed to a template kind selection screen shown in FIG. 23 (step 58). On the template kind selection screen, sections $A_{30}$, $A_{31}$, $A_{32}$, $A_{33}$, $A_{34}$, $A_{35}$, $A_{36}$, $A_{37}$, $A_{38}$ and $A_{39}$ are displayed. The section $A_{30}$ is a section touched by the user when printing is done by a large index (the large index is for making a list of a plurality of images recorded on the input medium). The section $A_{31}$ is a section touched by the user when printing is done by a photo frame (the photo frame is for printing an image recorded on the input medium like a picture fit in a photo frame). The section $A_{32}$ is a section touched by the user when printing is done by a cover poster (the cover poster is for printing an image recorded on the input medium like a magazine or a poster).

The section $A_{33}$ is a section touched by the user when printing is done by a calendar (the calendar is for printing an image recorded on the input medium on a part of a calendar). The section $A_{34}$ is a section touched by the user when printing is done by a decoration (the decoration is for extracting a part or the whole of an image recorded on the input medium and for printing an image obtained by decorating the extracted image). The section $A_{35}$ is a section touched by the user when printing is done by enlargement (the enlargement is for enlarging an image recorded on the input medium). The section $A_{36}$ is a section touched by the user when printing is done by art (the art is for artistically decorating an image recorded on the input medium). The section $A_{37}$ is a section touched by the user when printing is done by multi-size (the multi-size includes a plurality of identical subject images which differ in size). The section $A_{38}$ is a section touched by the user when printing is done by digital direct (the digital direct includes, when the input medium is a digital medium, an image represented by image data directly read out from the digital medium). The section $A_{39}$ is a section touched by the user when the kind of template must be explained.

It is assumed that the decoration is selected upon touching of the section $A_{34}$ by the user (YES in step 59). When a section other than the section $A_{34}$ is touched by the user, the display of the display device 33 is switched in correspondence to the touched section and the program proceeds to the corresponding processing.

Figure 24:
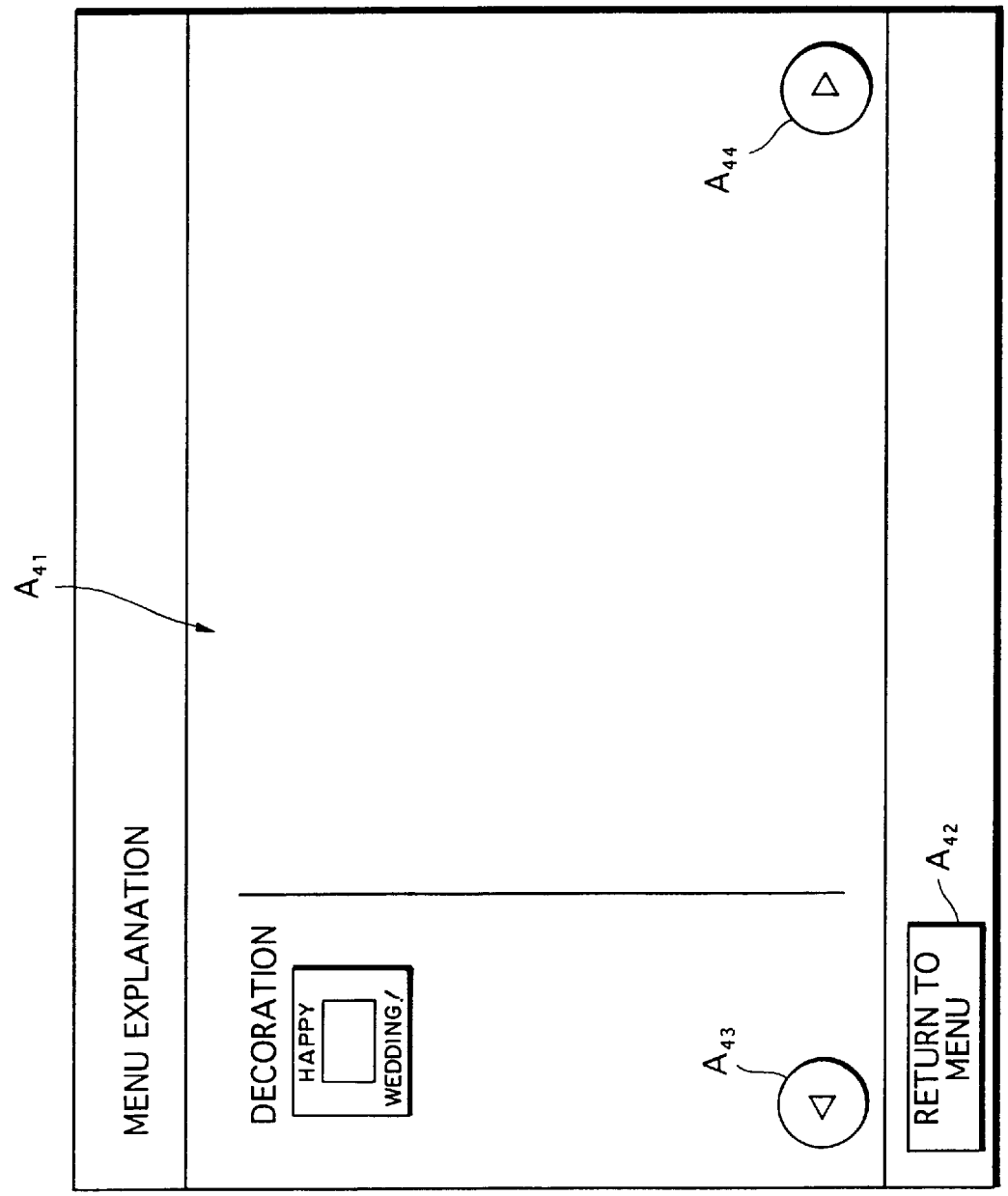

When the section $A_{34}$ is touched by the user, the display screen of the display device 33 is switched to a menu explanation screen shown in FIG. 24 (step 60). An area $A_{41}$, and sections $A_{42}$, $A_{43}$ and $A_{44}$ are displayed on the menu explanation screen. A sentence for explaining what is a template selected by the user and what subject image is suitably synthesized on the template is displayed in the area $A_{41}$ (the sentence for explanation is not illustrated in FIG. 24). When the number of sentences for explanation is large, all the sentences for explanation for the selected template cannot be displayed in the area $A_{41}$. Therefore, it is the section $A_{43}$ or $A_{44}$ that is touched in order to scroll the screen and read the sentences for explanation. When the section $A_{42}$ is touched by the user, the display screen of the display device 33 is returned to the template kind selection screen shown in FIG. 42. When the screen is scrolled to sentences for explanation on the final page, a new section (not shown) is displayed. When the new section is touched by the user, the display screen of the display device 33 is switched to a template type selection screen shown in FIG. 25 (step 61).

Figure 25:
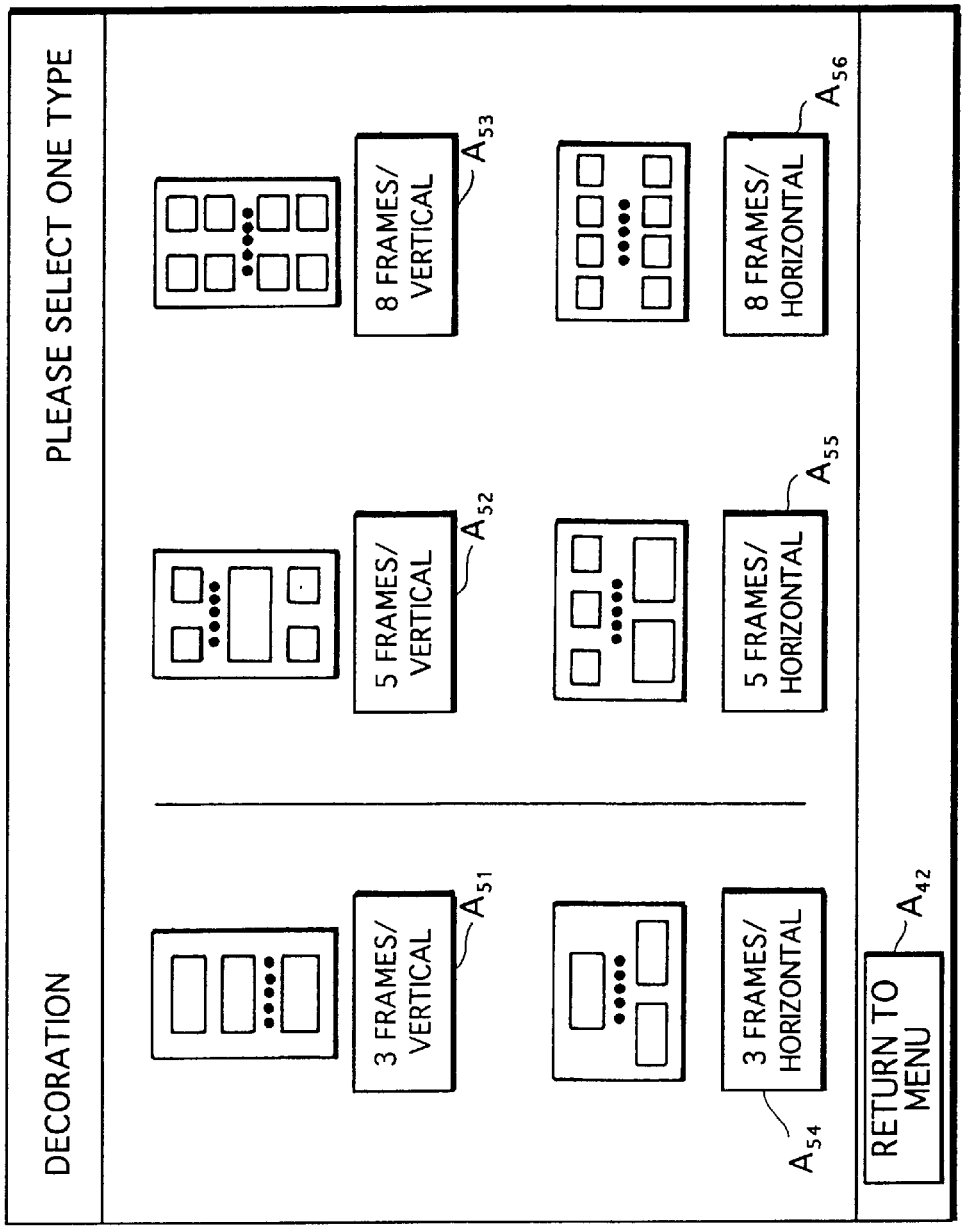

Templates are of many kinds: a decoration, a calendar, and a cover poster. One kind of template further includes many types of templates. The template type selection screen shown in FIG. 25 is displayed on the display device 33 when the type of template is selected.

Sections $A_{51}$, $A_{52}$, $A_{53}$, $A_{54}$, $A_{55}$, $A_{56}$ and $A_{42}$ are displayed on the template type selection screen. The section $A_{51}$ is a section touched by the user when images for three frames are vertically arranged on the template to synthesize the images. The section $A_{52}$ is a section touched by the user when images for five frames are vertically arranged on the template to synthesize the images. The section $A_{53}$ is a section touched by the user when images for eight frames are vertically arranged on the template to synthesize the images. The section $A_{54}$ is a section touched by the user when images for three frames are horizontally arranged on the template to synthesize the images. The section $A_{55}$ is a section touched by the user when images for five frames are horizontally arranged on the template to synthesize the images. The section $A_{56}$ is a section touched by the user when images for eight frames are horizontally arranged on the template to synthesize the images. When any one of the sections $A_{51}$ to $A_{56}$ is touched by the user (step 62), the display screen of the display device 33 is switched to a template decoration type selection screen shown in FIG. 26 (step 63).

Figure 26:

There are many types of templates (the number of frames corresponding to images synthesized on the template and the direction of the arrangement). One type of template further includes template decoration types. The template decoration type selection screen shown in FIG. 26 is displayed on the display device 33 when the decoration type is selected (step 63).

An area $A_{60}$ and sections $A_{10}$ and $A_{13}$ are displayed on the template decoration type selection screen. The area $A_{60}$ include a plurality of sections for selecting decorations of the template. The user touches a section representing a desired decoration out of the sections in the area $A_{60}$ (step 64).

A template used for image synthesis is specified by thus selecting all the kind, the type and the decoration type of the template. The data representing selected template kind, template type and decoration type are also stored in the RAM 45 (step 65).

When the template to be used is specified, data enlargement of template image data, selection of a subject image to be synthesized on the template, inlaying of the subject image on a template image, production of composite image data for printing are carried out (step 66).

First, template image data for image display representing the specified template image and template image data for printing corresponding to the template image data for image display are respectively read out from the hard disk. The template image data for image display and the template image data for printing which are read out are fed to the image memory 35, and are stored therein once. The template image data for printing is read out from the image memory 35, and is fed to the enlarging/reducing circuit 44. Since the template image data for printing stored in the hard disk is compressed, the data is expanded (decompressed) in the enlarging/reducing circuit 44. The expanded template image data for printing is fed to the image memory 35 again and is stored therein.

Mask image data for image display and mask image data for printing which respectively correspond to the template image data for image display and the template image data for printing which are read out from the hard disk are read out from the hard disk. Since the mask image data for printing is also compressed, the data is expanded in the enlarging/reducing circuit 44. The enlarged mask image data for printing is also fed to the image memory 35 and is stored therein once.

Furthermore, synthesis information corresponding to the template image specified by the user is also read out from the hard disk, and is stored once in the RAM 45.

An image selection screen (see, for example, FIG. 32) is then displayed on the display device 33. Reduced images represented by reduced image data which are read out from the APS photographic film brought by the user (which have been already stored in the hard disk as described above) are displayed in the image selection screen. When the user touches the desired reduced images out of the reduced images displayed in the screen, images to be synthesized on the template image are selected. Since the number of subject images which can be synthesized on the template image is predetermined in accordance with the type of template, the user can select the subject images, the number of which corresponds to the type.

When the selection of the subject images to be synthesized by the user has been completed, the display screen of the display device 33 is switched to an inlaying screen. The template image and a subject images to be synthesized on the template image both of which have been selected by the user are displayed in the inlaying screen. The user specifies a subject image and a position of the synthesis area on the template image. The subject image specified by the user is displayed in the specified synthesis area on the template image. The user adjust the size, the position and inclination (rotation) of the subject image. The information relating to the designation of the position, the adjustment of the size, the adjustment of the angle (the angle of rotation) and the alignment which are carried out are stored in the RAM 45 in correspondence to the selected and specified image. The above operation and processing are repeated as necessary, when a plurality of subject images are to be synthesized on the template image. As described in the foregoing, the image synthesis on the display screen of the display device 33 is completed.

In the image synthesis for printing, subject images selected in the image synthesis on the display screen of the display device 33 out of images recorded on the APS photographic film brought by the user are read from the APS photographic film by the scanner 42, and image data representing the images are stored in the image memory 35. IX information recorded on the APS photographic film is used in order to determine which image should be read.

The size of the subject image represented by the image data stored in the image memory 35 does not generally coincide with the size of the template image represented by the template image data for printing. Therefore, the subject image is re-sized based on the information relating to the adjustment of the size and the adjustment of the angle (the angle of rotation) obtained in the image synthesis on the display screen of the display device 33 so that the size thereof coincides with the size of the template image for printing.

The range of an image to be synthesized on the template image is then determined by referring to the information relating to the adjustment of the size and the adjustment of the angle (the angle of rotation) obtained in the image synthesis on the display screen of the display device 33 or a synthesis definition range. A portion of the range of the subject image to be synthesized (the synthesis definition range) is extracted. Image synthesis processing is performed on the basis of the designation of the position and the information relating to the alignment which are obtained in the image synthesis on the display screen of the display device 33. When there is a plurality of subject images to be synthesized, the above processing is repeated. Thus the synthesized composite image data for printing is obtained and is stored in the image memory 35.

When the image synthesis is terminated on the display screen of the display device 33 (when the processing in the step 66 is terminated), a screen for confirming whether or not characters should be inserted into a composite image is displayed on the display device 33 (step 67). When characters are added (YES in step 68), keys of hiragana and katakana (Japanese), alphabets, signs, etc. are displayed on the display screen of the display device 33 (step 69). The user can add characters to the composite image by touching the keys displayed on the display screen of the display device 33.

Figure 27:
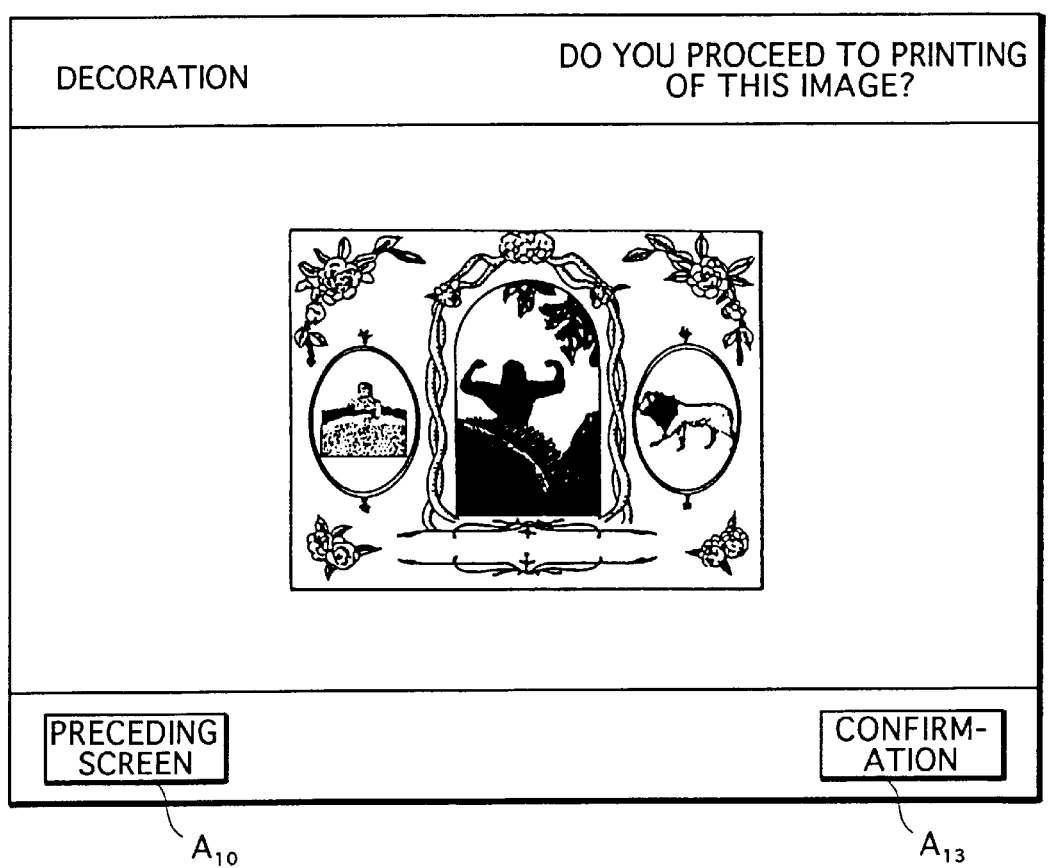

When entry of characters into the composite image is terminated or no entry of characters is required, a printing confirmation screen shown in FIG. 27 is displayed on the display device 33 (step 70). The composite image is included in this printing confirmation screen. The section $A_{13}$ is touched upon confirmation by the user. When the user does not want to print the composite image displayed on the display screen of the display device 33, he or she touches the section $A_{10}$, whereby the display screen of the display device 33 is returned to the preceding screen. When the section $A_{13}$ is touched by the user, the display screen of the display device 33 is switched to a number-of-prints confirmation screen shown in FIG. 28 (step 71).

Sections $A_{10}$, $A_{13}$, $A_{61}$ and $A_{81}$ and an area $A_{80}$ are displayed on the number-of-prints confirmation screen. Numeric keys 0 to 9 are displayed in the area $A_{80}$. When the numeric keys are touched by the user, the number of prints is entered. The entered number of prints is displayed in the section $A_{81}$. When the user erroneously enters the number of prints, the number of prints is entered again upon touching the section $A_{61}$. The data indicating the number of prints entered by the user is stored in the RAM 45 (step 72). When the number of prints is determined, the section $A_{13}$ is touched by the user. When the section $A_{13}$ is touched, the display screen of the display device 33 is switched to an on-printing display screen shown in FIG. 29 (step 73).

An area $A_{86}$ and sections $A_{83}$, $A_{84}$ and $A_{85}$ are displayed on the on-printing display screen. A simple animation (not illustrated) is displayed in the area $A_{86}$ during printing. In order to stop printing, the section $A_{83}$ is touched by the user. When a template is changed to do another printing, the section $A_{84}$ is touched by the user. When the printing is ended, the section $A_{85}$ is touched by the user.

While the on-printing display screen appears on the display device 33, the printer 37 prints the composite image using the composite image data already created and stored in the image memory 35 (step 74). At the time of the printing, the template image data for printing and the mask image data for printing which have high resolution are used, whereby a high-quality composite image can be printed. Data representing the composite image may be stored in the hard disk, the floppy disk, or the like. Consequently, the data representing the composite image is read out again, whereby the composite image can be obtained again relatively simply.

Further, while the image printing is being executed, the contents of the services set by the user and performed by the image filing/printing apparatus are printed on a slip on the basis of the data stored in the RAM 45 to be issued by the slip printer 48 (step 77).

FIGS. 34a to 34d show examples of issued slips carrying thereon information representing the contents of services. FIGS. 34a and 34b are examples of slips issued in a case of a photo-joy print service, whereas FIGS. 34c and 34d are examples of slips issued in a case of a digital output service. FIG. 34e shows an examples of a slip issued when the service is cancelled.

What is printed on the slip are the date utilizing the image filing/printing apparatus, service name, kind of input medium, type if required, number of services, and service No. The "service name" represents the photo-joy print service (indicated by "P") or the digital output service (indicated by "D"), and the kind of template used. The "input medium" indicates what kind of input medium is inserted in or mounted on the image filing/printing apparatus. The "type" indicates the decoration type of the used template. The "number of services" means the number of prints in a case of the photo-joy print service, and the number of frames read from the input medium in a case of the digital output service. The "service No." comprises a service number incremented for each execution of service and a number of re-issue of the slip.

The contents of the service offered to the customer (user) can be identified by the service No. The clerk of the store can also see the number of slip re-issue.

Figure 30:
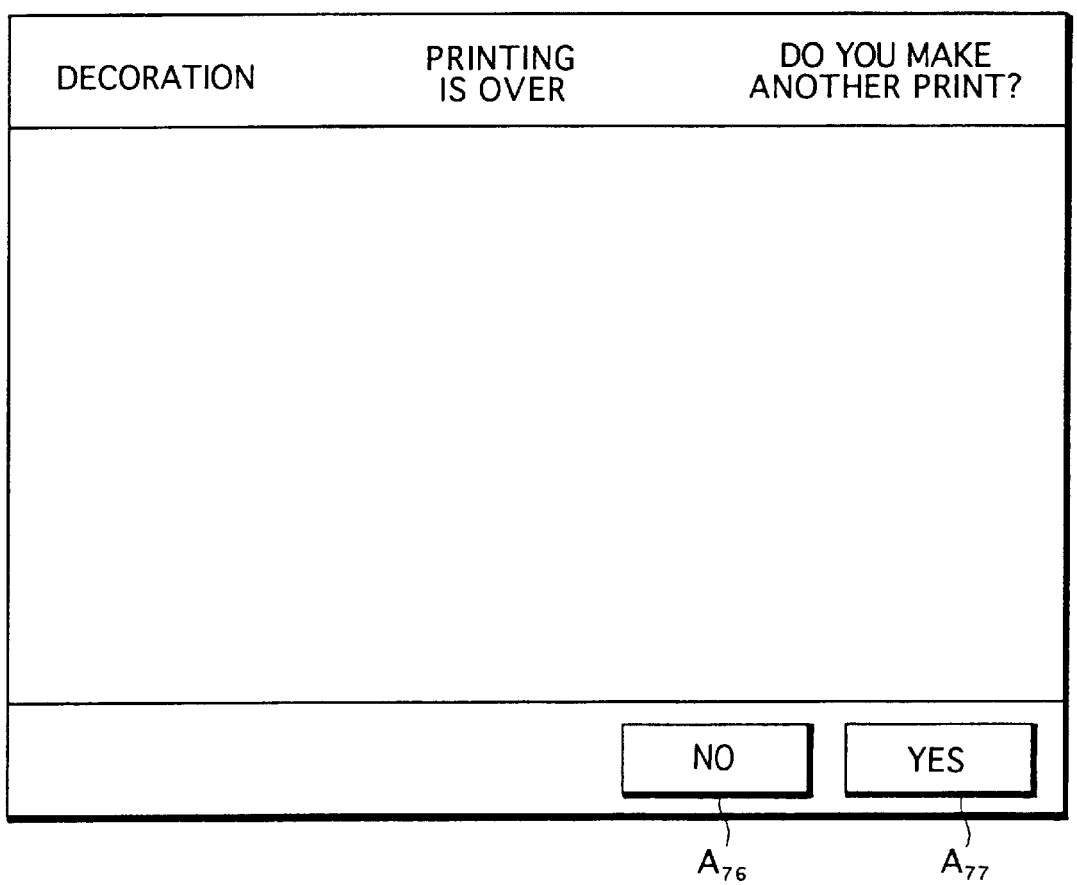

When the section $A_{85}$ is touched by the user, the display screen of the display device 33 is changed to a print ending screen shown in FIG. 30 (step 78).

Sections $A_{76}$ and $A_{77}$ are displayed on the print ending screen. The section $A_{76}$ is a section touched by the user when printing is to be ended, and the section $A_{77}$ is a section touched by the user when the printing is continued. When the section $A_{76}$ is touched (NO in step 79), the display screen of the display device 33 is switched to a guide screen indicating that an APS photographic film inserted in the image filing/printing apparatus is to be taken out (step 80). When the APS photographic film is taken out from the image filing/printing apparatus, the display screen of the display device 33 is returned to the general service screen shown in FIG. 20 (step 125 in FIG. 14). When the section $A_{77}$ is touched (YES in step 79), the display screen of the display device 33 is switched to the template kind selection screen shown in FIG. 23 (step 58 in FIG. 15). Consequently, the user can select a template again and do printing.

Figure 29:
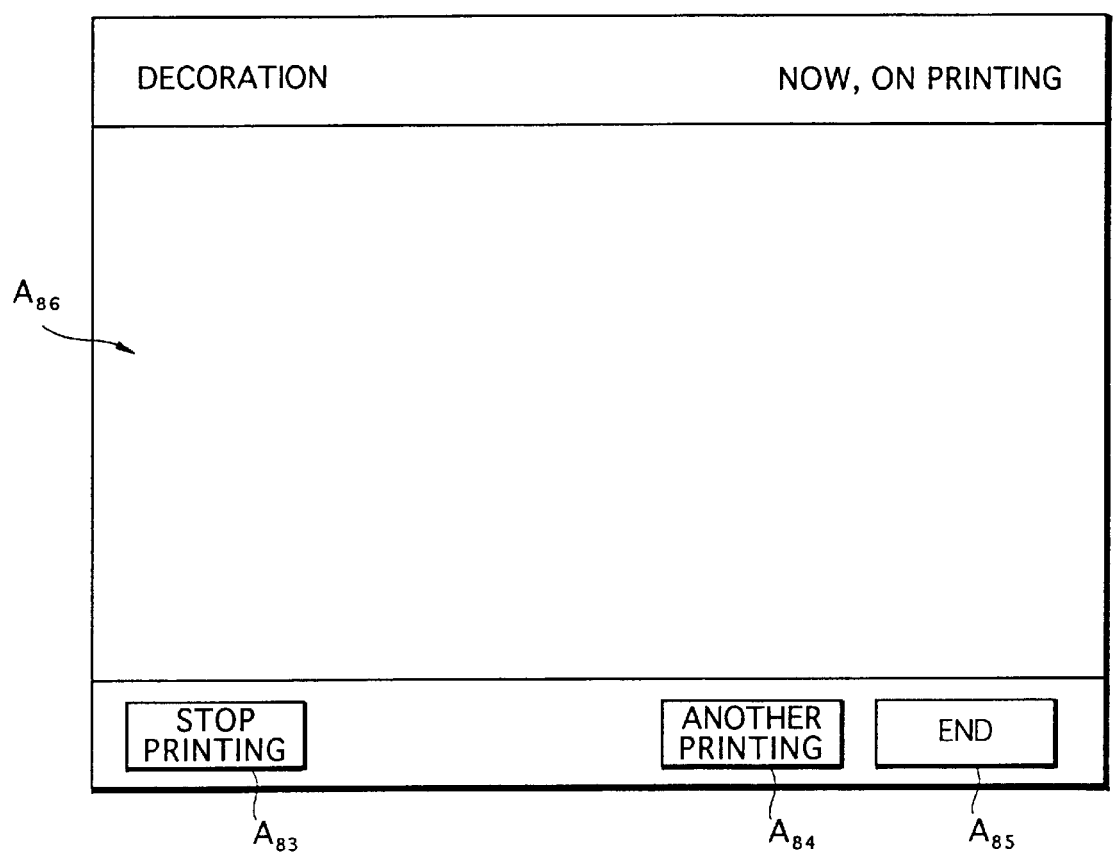

While the on-printing display screen shown in FIG. 29 is displayed, if the section $A_{83}$ is touched by the user (YES in step 75), the data stored in the RAM 45 is read out, and a slip as shown in FIG. 34e is printed and issued by the slip printer 48 (step 76). The slip shows the date when the image filing/printing apparatus is used and that the service has been cancelled.

As mentioned above, the issued slip is shown to the clerk of the store by the user or handed over to the clerk of the store from the user, so that the clerk knows what is performed by the image filing/printing apparatus and can charge the user for the service based on the information carried on the slip.

In the above photo-joy print service processing of the present invention, of course, a magneto-optic disk, a magnetic disk or a memory card may be selected as an input medium (step 52 in FIG. 15 and FIG. 22). The image data representing an image produced by synthesizing the subject image to the template image may be recorded on a digital medium such as a magneto-optic disk, a magnetic disk and a memory card. Further if the section $A_{38}$ is touched when the template kind selection screen shown in FIG. 23 is displayed (step 58 in FIG. 15), the program proceeds to the digital direct processing, in which a digital medium such as a magneto-optic disk, a magnetic disk or a memory card is selected as an input medium, an image represented by image data recorded on the digital medium is printed.

In the above example of the photo-joy print service, although the decoration is selected as a kind of the template (step 59 in FIG. 15 and FIG. 23), the printing of a composite image or the recording of the image data on the digital medium will be similarly executed even when other template is selected. Color conversion from a color image to a monochrome image, rotation of an image and so on may be performed in addition to image synthesis to the template image. These image processing may be performed under the control of the MPU 30. Enlargement or reduction of an image, or expansion or compression of image data may be executed by the enlarging/reducing circuit 44.

③ Digital Output Service

Figure 17:
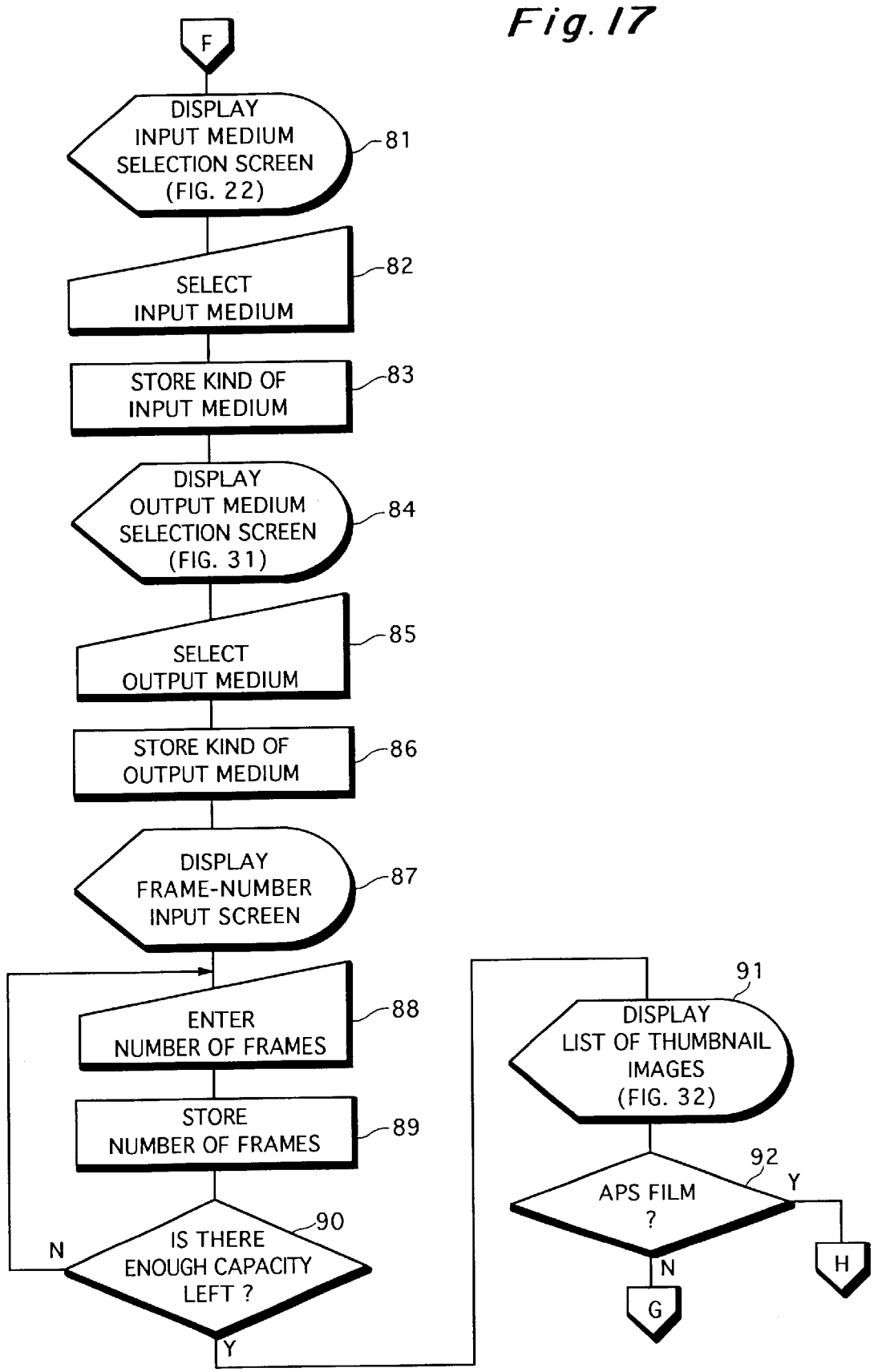

In the service selection screen shown in FIG. 21, when the section $A_{12}$ is touched, the digital output service starts (NO in step 129 of FIG. 14) and an input medium selection screen shown in FIG. 22 appears on the screen of the display device 33 (step 81 in FIG. 17).

Figure 31:
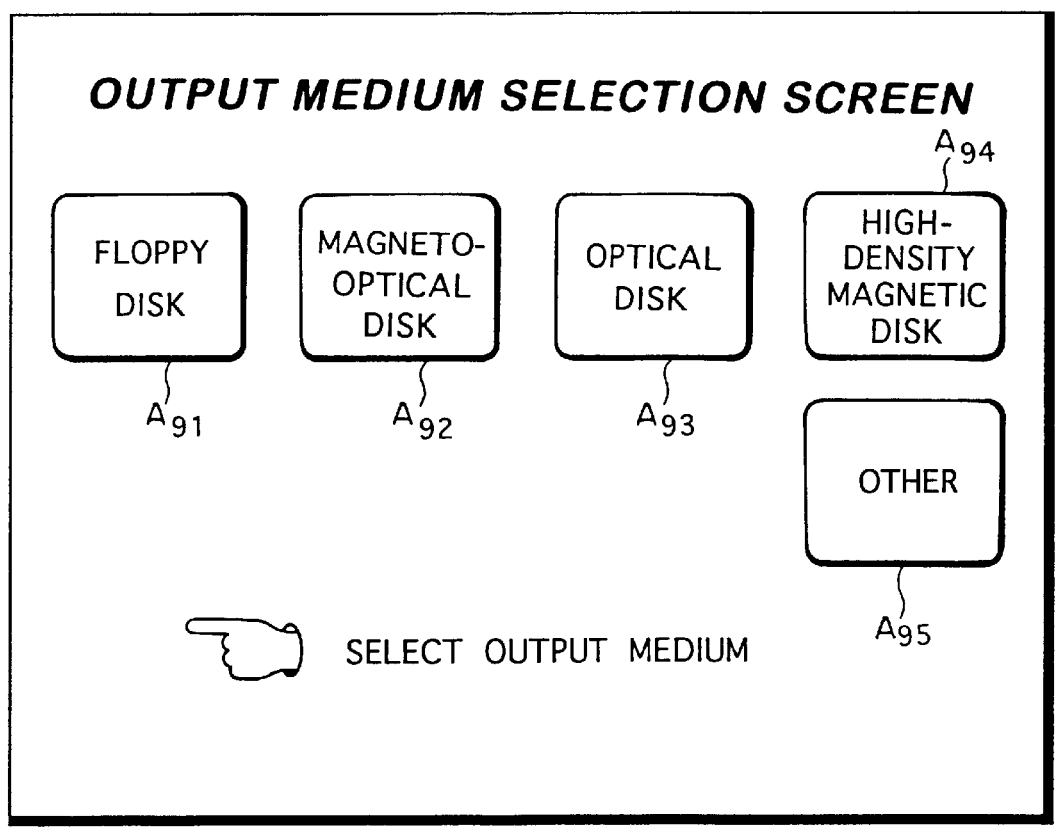

When one of the input media is selected by the user in accordance with the input medium selection screen (step 82), data representing the selected kind of input medium is stored in the RAM 45 (step 82), and the display screen on the display device 33 changes over to an output medium selection screen shown in FIG. 31 (step 84). Five areas $A_{91}$, $A_{92}$, $A_{93}$, $A_{94}$ and $A_{95}$ surrounded by frames are displayed on the output medium selection screen. The area $A_{91}$ is touched by the user when the output medium is the floppy disk, the area $A_{92}$ when the output medium is the magneto-optical disk, the area $A_{93}$ when the output medium is the optical disk, the area $A_{94}$ when the output medium is the high-density magnetic disk, and area $A_{95}$ when the output medium is of another type. The user touches the area that conforms to the output medium taken by the user (step 85). Whichever of the floppy disk drive 39 or optical disk drive 46 suits the output medium is selected and the output medium is loaded in the selected device by the user. Data indicative of the selected kind of the output medium is stored in the RAM 45 (step 86).

Figure 28:
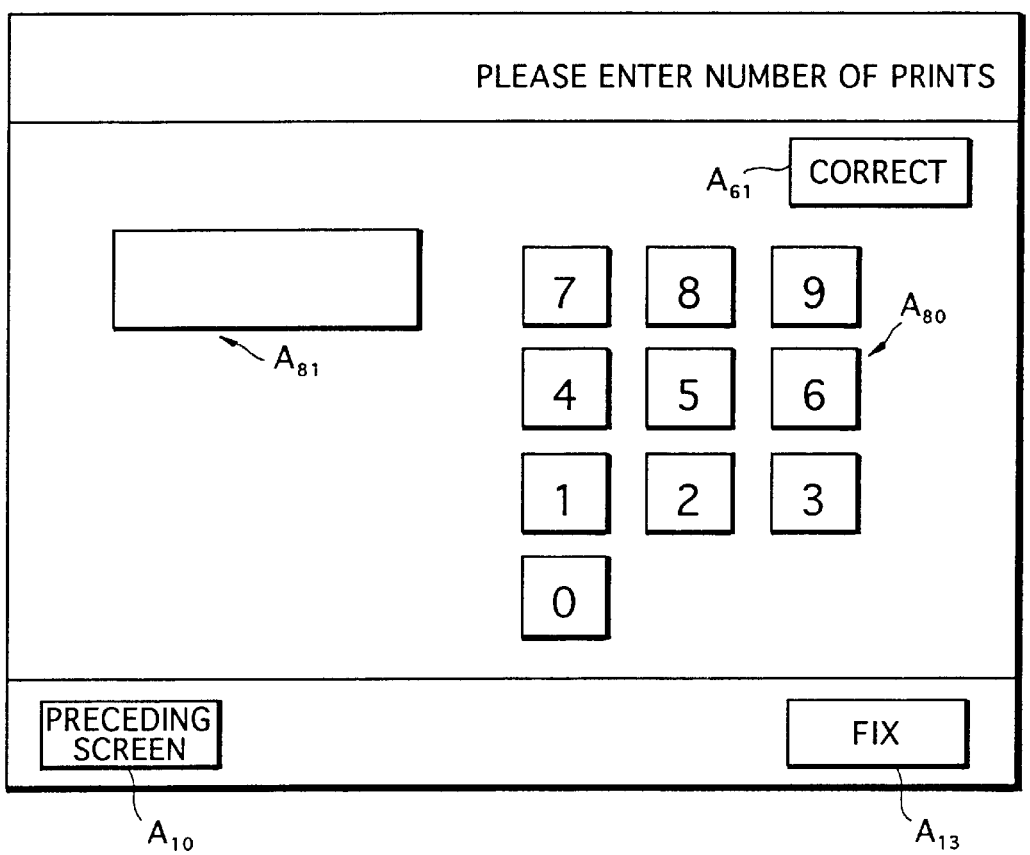

When the selection using the output medium selection screen is finished, the display screen on the display device 33 changes over to a frame-number input screen similar to the number-of-prints confirmation screen shown in FIG. 28, which includes sections corresponding to the sections $A_{10}$, $A_{13}$, $A_{61}$ and $A_{81}$ in FIG. 28 and an area corresponding to the area $A_{80}$ in FIG. 28.

By touching the numeric keypad on the screen contained in the area corresponding to the area $A_{80}$, the user enters the number of frames of subject images represented by the image data to be recorded on the output medium (step 88). The data indicating the entered number of frames are stored in the RAM 45 (step 89). The entered number of frames is displayed in the section corresponding to the section $A_{81}$. The remaining capacity of the output medium set in the image filing/printing apparatus is calculated and it is determined whether a data capacity required for the image data representing the subject images of the entered number of frames remains (step 90). If capacity for storing the image data representing the images of the number of frames entered on the frame-number input screen does not remain on the output medium that has been set in the image filing/printing apparatus, a command calling for the user to revise the entry of the number of frames is displayed on the display device 33 (NO in step 90).

If there is enough storage capacity remaining on the output medium (YES in step 97), then all of the images that appear on the input medium are prescanned by the scanner 42 and thumbnail image data representing thumbnail images of these images are obtained. The thumbnail image data are applied to the display device 33, where the thumbnail images are displayed in columns, as shown in FIG. 32 (step 91).

Figure 32:
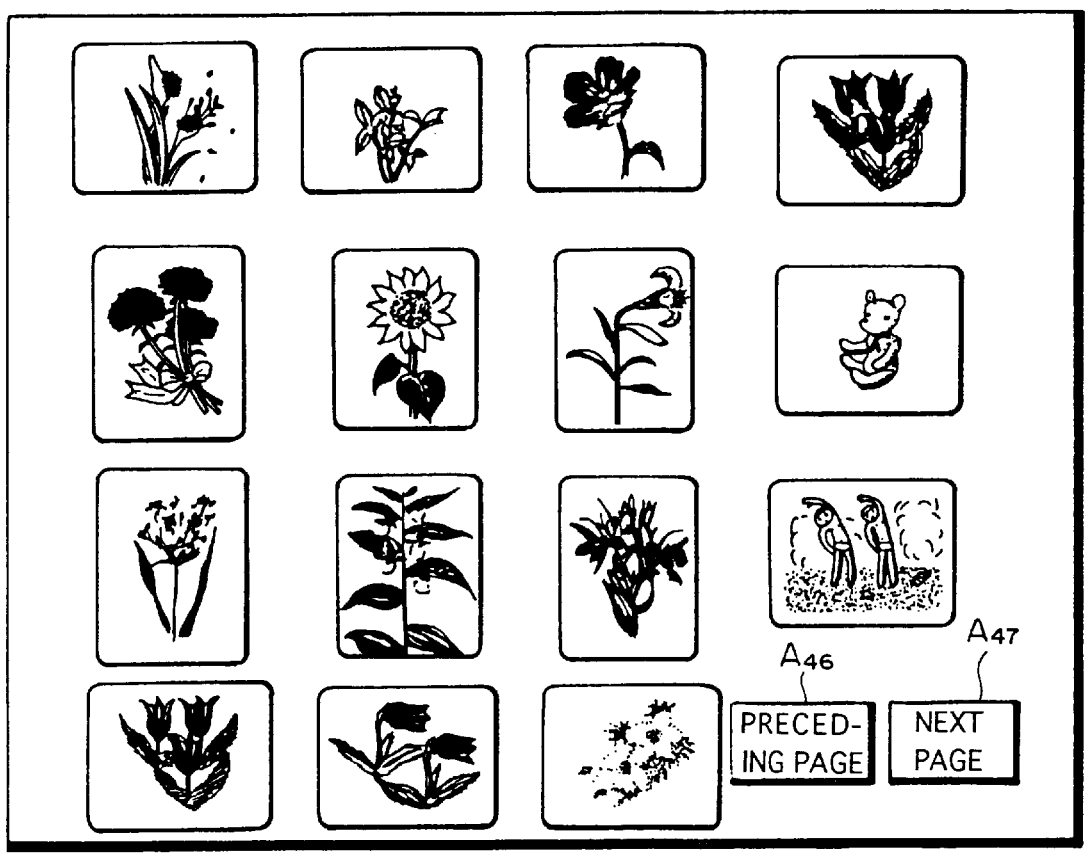

The screen showing the columns of thumbnail images in FIG. 32 includes an area $A_{46}$ which, by being touched by the user, effects a return to the preceding page, and an area $A_{47}$ which, by being touched by the user, turns the page to the next page. The desired thumbnail image is searched by touching the area $A_{46}$ or $A_{47}$.

It is determined whether the input medium is the APS photographic film (step 92). If the input medium is the APS photographic film (YES in step 92), then the IX information that has been recorded on the information recording area $3a$, $3b$, $3c$ and $3d$ of the APS photographic film is read (step 93 of FIG. 18). During the reading of the IX information, a screen representing this fact is displayed on the display device 33 (step 94). Since the user must spend time waiting during the reading of the IX information, a simple animation or the like may be displayed on the display screen of the display device 33. Furthermore, it is determined whether the read IX information includes title information (step 95). If the read IX information includes title information (YES in step 95), then this title information is stored temporarily in the RAM 45 (step 96). If the read IX information does not include title information (NO in step 95), then the processing of step 96 is skipped.

If t he input medium is not the APS film, the processings of step 93 to step 96 are skipped (NO in step 92).

Next, while observing the columns of displayed thumbnail images shown in FIG. 32, the user selects a subject image that will be recorded on the output medium (step 97). This selection is carried out by the user's touching the thumbnail image being displayed on the display screen of the display device 33. The image on the input medium corresponding to the thumbnail image touched by the user undergoes main scanning, so that the original image data thereof are obtained. The fact that the image is being acquired is displayed on the display screen of the display device 33 in the manner shown in FIG. 33 during the reading of the image (step 98). It is of course permissible to display a simple animation at this time.

While the fact that the image is being acquired is displayed on the display device 33, the contents of the service the user has set and the image filing/printing apparatus has performed are printed on the slip and the slip is issued by the slip printer 48 (step 99). In a case of the digital output service, as shown in FIGS. 34c and 34d, a mark "D" is printed on the slip at the item of the service name. The service name "Optical Disk/Normal" shown in FIG. 34c means that the output medium is an optical disk and the data compression ratio is standard one. The service name "FD/Economy" shown in FIG. 34d means that the output medium is a floppy disk and the data compression ratio is high.

The original digital image data obtained by the main scanning in the scanner 42 of the subject image appearing on the input medium, which is for printing, are temporarily stored in the image memory 35 (step 100). The original digital image data are subjected to data compression in the enlarging/reducing circuit 44 (step 101). The high-definition image data, the standard image data and thumbnail image data are also produced by reducing the original image data for printing. The original digital image data and other type of image data derived from the original image data are recorded on the output medium. Of course, only the original image data for printing may be recorded on the output medium. When the processing for recording the image data on the output medium has been completed, the display device 33 notifies the fact on its screen. If the user touches a certain section appearing on the display screen notifying the fact that recording of the image data on the output medium has been completed, the screen switches to the general service screen shown in FIG. 20.

Figure 33:
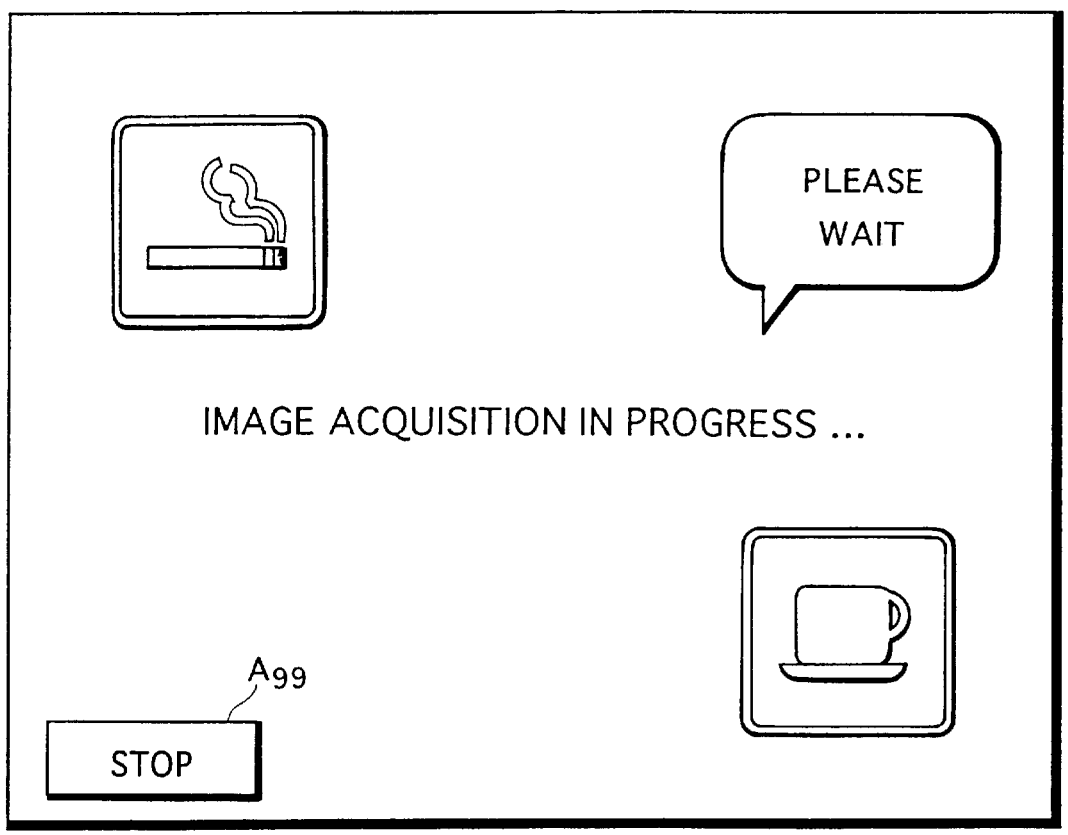

The user can cancel or stop the service during the digital output service processing. The section $A_{99}$ appearing on the image acquisition screen shown in FIG. 33 is touched (YES in step 103), the acquisition of the image data is stopped. The slip printer 48 prints and issues a slip showing that the service has been cancelled as shown in FIG. 34e.

As described above, in the digital output service processing too, the data stored in the RAM 45 during the processing are read out therefrom and the slip printer 48 prints and issues a slip indicating the contents of the service or a slip indicating the cancellation of the service based on the read-out data. The clerk of the convenience store sees the issued slip which the user (customer) hands over to the clerk and understands the contents of the service offered to the customer and charges the customer for the service.

(9) Other Embodiments

FIG. 35 is a plane view of a convenience store where the image filing/printing apparatus 200 is disposed.

The image filing/printing apparatus 200 is connected on-line to ECRs 210 also disposed in the convenience store. The ECR (electronic cash register) 210 includes a CPU, a display device, a memory, a printer, a modem and so on, so that data can be transmitted from the image filing/printing apparatus 200 to the ECR 210.

Figure 36:
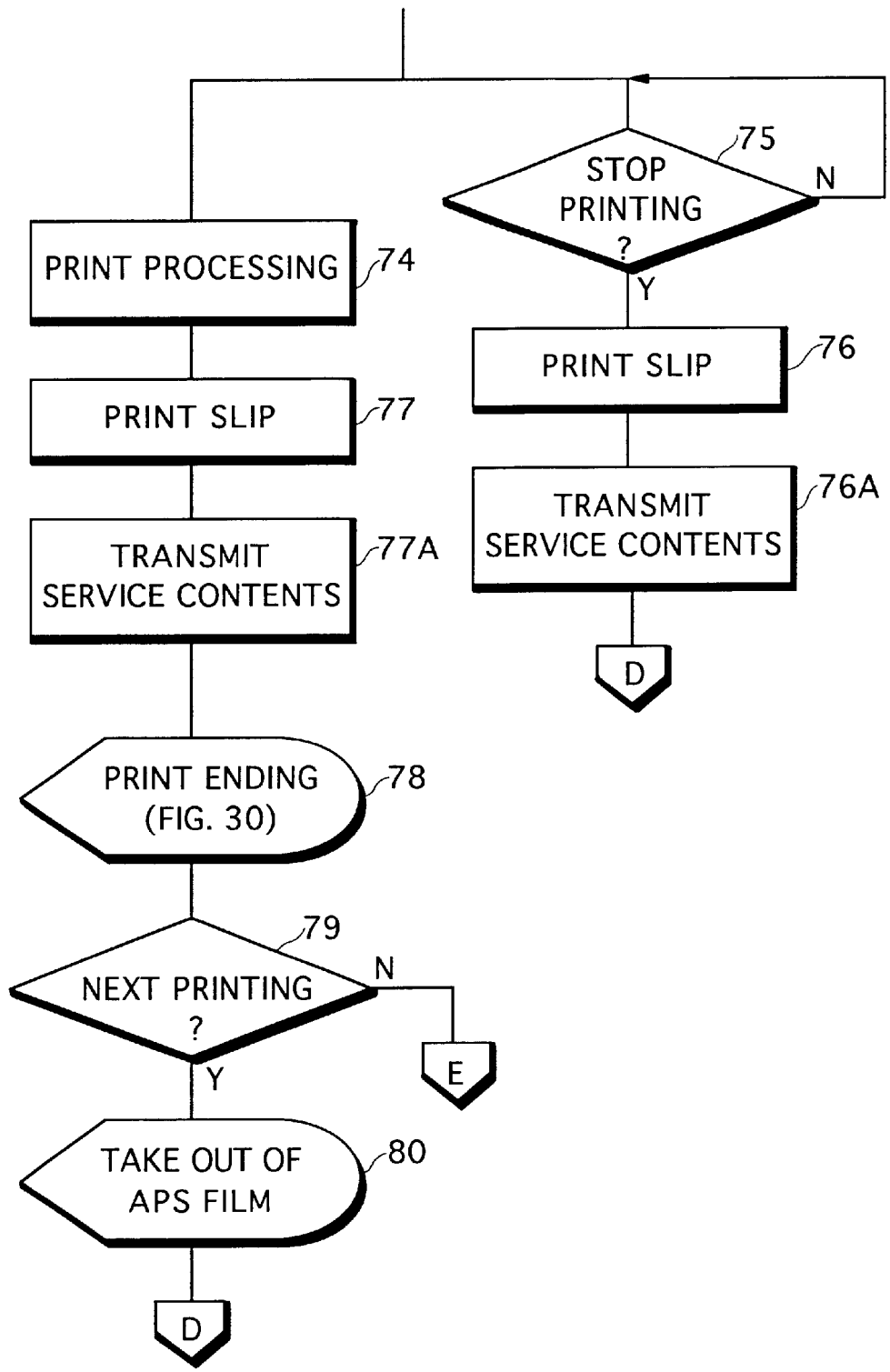
FIGS. 36 and 37 are flow charts showing the procedure for processing in the image filing and printing apparatus according to another embodiment.

FIG. 36 is a flow-chart showing a part of the photo-joy print service processing and corresponding to a part of the processing shown in FIG. 16. In FIG. 36, the same processings as those in FIG. 16 are indicated by the same reference numerals and the description thereof is omitted.

As mentioned above, data stored in the RAM 45 in the course of service processing and relating to the service performed by the apparatus 200 are read out to be printed on the slip by the slip printer 48. The data stored in the RAM 45 and representing the contents of the service to be printed are also read out therefrom to be transmitted to the ECR 210 from the modem 49 of the image filing/printing apparatus 200 (steps 76A and 77A).

Figure 18:
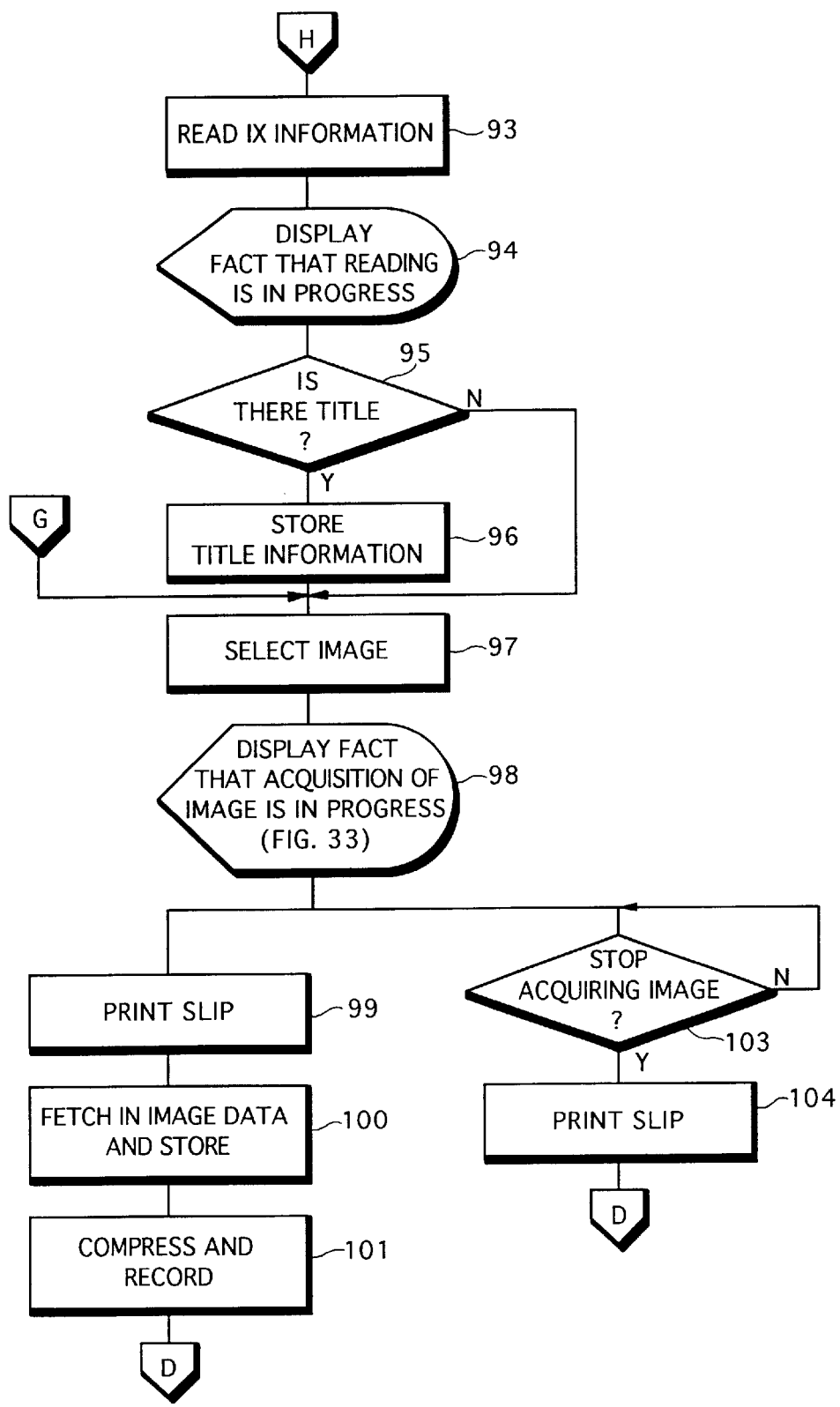
Figure 37:
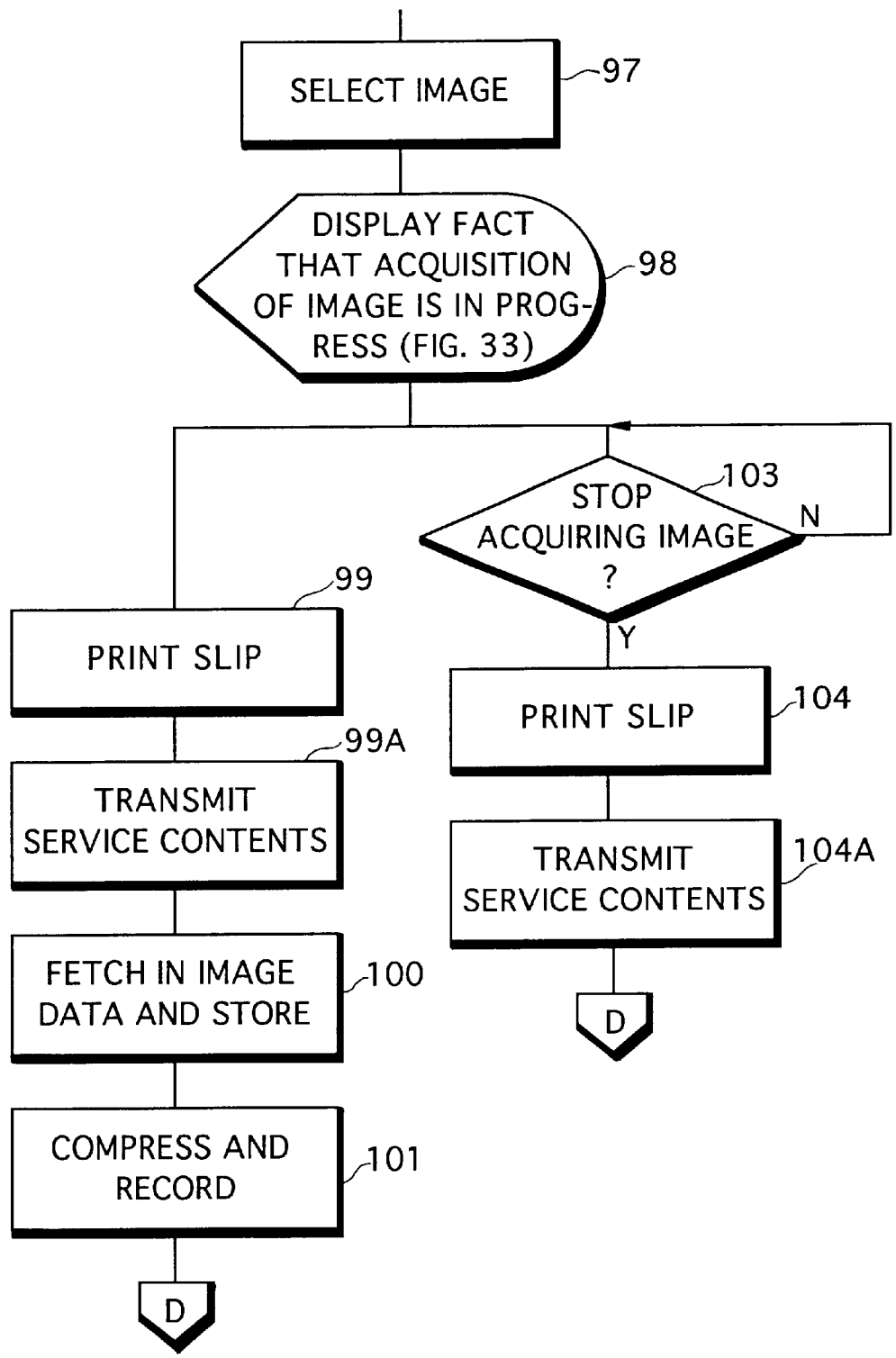

FIG. 37 is a flow chart showing a part of the digital output service and corresponding to a part of the processing shown in FIG. 18. The same reference numerals are added to the same processings of FIG. 37 as those in FIG. 18, and the description thereof is omitted.

In the digital output service, data showing the service contents which are printed on the slip by the slip printer 48 are also read out from the RAM 45 and are transmitted to the ECR 210 (steps 99A and 104A).

Figure 38:
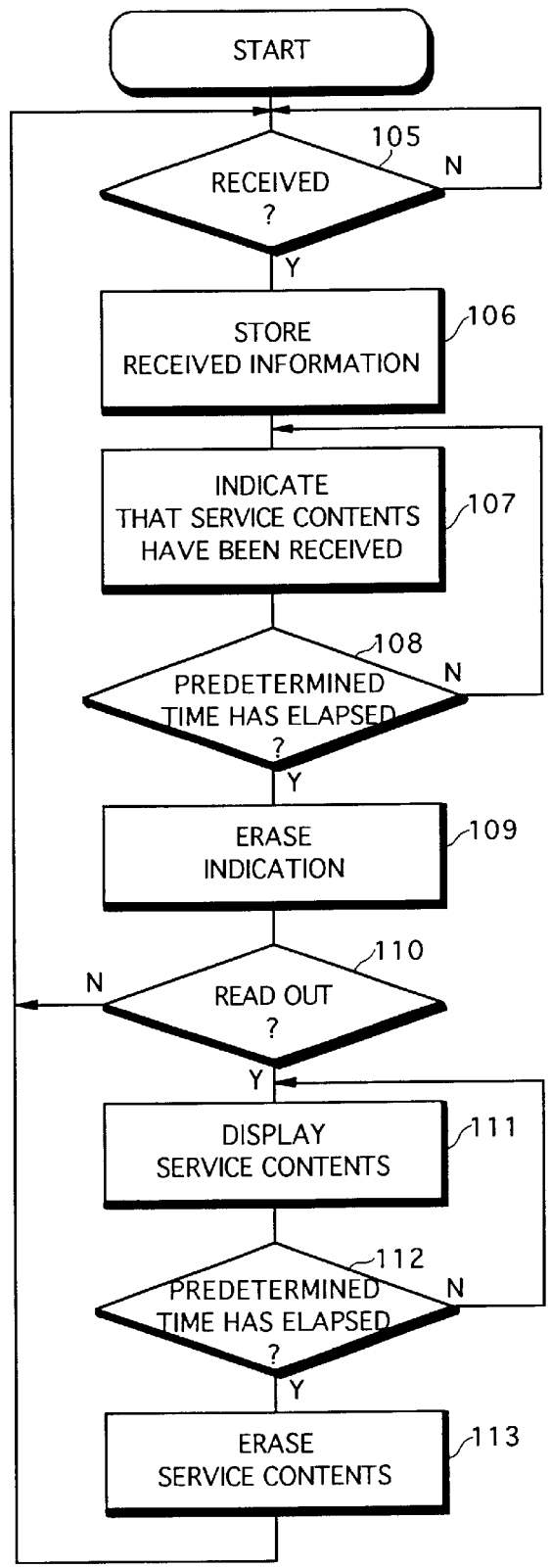
FIG. 38 is a flow chart showing the procedure for processing in an electronic cash register.

FIG. 38 is a flow chart showing the processing procedure in the ECR 210.

When the data indicating the contents printed on the slip and transmitted from the image filing/printing apparatus 200 are received by the ECR 210 (YES in step 105), the received data are temporarily stored in a memory of the ECR 210 (step 106). In response thereto, the fact that the data relating to the service contents have been received is displayed on the display device of the ECR 210 as shown in FIG. 39a (step 107). In this time, the service contents are not displayed. The registration processing in the ECR 210 is continued, but the display of items relating to sales to be registered, such as IDs of goods, prices of goods, total amount etc., does not vanish. The indication relating to the fact that the data of the service contents have been received vanishes from the display screen, when a predetermined time has elapsed (YES in step 108 and step 109).

The customer (user) takes the slip issued by the image filing/printing apparatus 200 and carrying thereon information relating to the service contents and shows the slip to the clerk, who then inputs a read command and the service No. printed on the slip into the ECR 210. In response to the read command and the service No., the data stored in the memory of the ECR 210 and representing the service contents including the same service No. as the input service No. are read out from the memory (step 110) and the read data, which are just the data transmitted from the image filing/printing apparatus 200 to the ECR 210 are displayed on the display device of the ECR 210 shown in FIG. 39b (step 111). The displayed data also vanish from the display screen when a predetermined time has elapsed (steps 112, 113).

The clerk of the convenience store can collate the service contents printed on the slip which is taken by the customer with the service contents displayed on the display device of the ECR 210.

In above embodiment, the image filing/printing apparatus is placed at the convenience store, but the apparatus may be placed at any other location in a state that the apparatus issues the slip.

The data indicative of the service contents transmitted from the image filing/printing apparatus 200 may be sent to a computer disposed in the head office of the convenience store using an ISDN terminal unit 220. The head office can collectively manage the services performed in a plurality of image filing/printing apparatuses placed at the convenience stores.

It goes without saying that some record (log) of the service contents performed by the image printing/filing apparatus is saved in the hard disk, printed on a journal or transmitted to a central computer for each day, week or month.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image printing system comprising:
   an image printing apparatus and a charging information confirming apparatus, said image printing apparatus and said charging information confirming apparatus being connected so as to communicate with each other,
   said image printing apparatus including,
   a digital medium reading device reading digital image data recorded on a digital medium;
   an image printer printing an image represented by the digital image data read by said digital medium reading device;
   a charging information printer printing charging information necessary for print service charge, said charging information relating to image print processing executed in said image printer; and
   a charging information transmitting device sending the charging information to said charging information confirming apparatus,
   said charging information confirming apparatus including,
   a charging information receiving device receiving the charging information sent from said charging information transmitting device; and
   a display device displaying the charging information received by said charging information receiving device,
   wherein the displayed charging information is visually compared to the printed charging information in order to confirm the charging information.

2. The image printing system according to claim 1 wherein said charging information confirming apparatus is an electronic cash register.

3. The image printing system according to claim 1 wherein said image printing apparatus further comprises:
   an image processor executing image treatment processing including at least one of enlarging, reducing, compressing, rotating, synthesizing to a template image and color conversion of the image represented by the digital image data read by said digital medium reading device, wherein said image printer prints the image processed by said image processor.

4. The image printing system according to claim 1 wherein the charging information includes at least one of a date, a service name, a kind of the digital medium, a form of print, a number of prints and a service number.

5. The image printing system according to claim 1 wherein the charging information includes information relating to cancellation of the image print processing by said image printer when the image print processing by said image printer is cancelled.

6. An image printing system comprising:

an image printing apparatus and a charging information confirming apparatus, said image printing apparatus and said charging information confirming apparatus being connected so as to communicate with each other, said image printing apparatus including, a visible image medium reading device reading a visible image appearing on a visible image medium and outputting a signal representing the visible image;

an image printer printing an image represented by the signal outputted from said visible image medium reading device;

a charging information printer printing charging information necessary for print service charge, said charging information relating to image print processing executed in said image printer; and a charging information transmitting device sending the charging information to said charging information confirming apparatus, said charging information confirming apparatus including, a charging information receiving device receiving the charging information sent from said charging information transmitting device; and a display device displaying the charging information received by said charging information receiving device, wherein the displayed charging information is visually compared to the printed charging information in order to confirm the charging information.

7. The image printing system according to claim 6 wherein said charging information confirming apparatus is an electronic cash register.

8. The image printing system according to claim 6 wherein said image printing apparatus further comprises:

an image processor executing image treatment processing including at least one of enlarging, reducing, compressing, rotating, synthesizing to a template image and color conversion of the image represented by the signal outputted by said visible image medium reading device, wherein said image printer prints the image processed by said image processor.

9. The image printing system according to claim 6 wherein the charging information includes at least one of a date, a service name, a kind of the visible image medium, a form of print, a number of prints and a service number.

10. The image printing system according to claim 6 wherein the charging information includes information relating to cancellation of the image print processing by said image printer when the image print processing by said image printer is cancelled.

11. An image filing system comprising:

an image filing apparatus and a charging information confirming apparatus, said image filing apparatus and said charging information confirming apparatus being connected so as to communicate with each other, said image filing apparatus including, a visible image medium reading device reading a visible image appearing on a visible image medium and outputting digital image data representing the visible image;

a digital medium recording device recording on a digital medium the digital image data representing the visible image and outputted from said visible image medium reading device; and a charging information printer printing charging information necessary for a recording service charge, said charging information relating to the recording executed in said digital medium recording device; and a charging information transmitting device sending the charging information to said charging information confirming apparatus, said charging information confirming apparatus including, a charging information receiving device receiving the charging information sent from said charging information transmitting device; and a display device displaying the charging information received by said charging information receiving device, wherein the displayed charging information is visually compared to the printed charging information in order to confirm the charging information.

12. The image printing system according to claim 11 wherein said charging information confirming apparatus is an electronic cash register.

13. The image filing system according to claim 11 wherein said image filing apparatus further comprises:

an image processor executing image treatment processing including at least one of enlarging, reducing, compressing, rotating, synthesizing to a template image and color conversion of the image represented by the digital image data outputted from said visible image medium reading device, wherein said digital medium recording device records the digital image data representing the image processed by said image processor.

14. The image filing system according to claim 11 wherein the charging information includes at least one of a date, a service name, a kind of the visible image medium, a number of frames and a service number.

15. The image filing system according to claim 11 wherein the charging information includes information relating to cancellation of the record processing by said digital medium recording device when the record processing by said digital medium recording device is cancelled.

* * * * *